US010554727B2

(12) United States Patent
Choi et al.

(10) Patent No.: US 10,554,727 B2
(45) Date of Patent: Feb. 4, 2020

(54) METHOD AND APPARATUS FOR CONTROLLING MULTI-CONNECTION FOR DATA TRANSMISSION RATE IMPROVEMENT

(71) Applicant: Samsung Electronics Co., Ltd., Suwon-si, Gyeonggi-do (KR)

(72) Inventors: Jeong-seok Choi, Yongin-si (KR); Do-young Joung, Seoul (KR); Soon-gi Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 15/558,869

(22) PCT Filed: Nov. 5, 2015

(86) PCT No.: PCT/KR2015/011853
§ 371 (c)(1),
(2) Date: Sep. 15, 2017

(87) PCT Pub. No.: WO2016/148370
PCT Pub. Date: Sep. 22, 2016

(65) Prior Publication Data
US 2018/0077217 A1 Mar. 15, 2018

(30) Foreign Application Priority Data
Mar. 17, 2015 (KR) .................. 10-2015-0036758

(51) Int. Cl.
*H04L 29/08* (2006.01)
*H04L 29/06* (2006.01)
(Continued)

(52) U.S. Cl.
CPC ............ *H04L 67/025* (2013.01); *H04L 29/08* (2013.01); *H04L 43/0888* (2013.01); (Continued)

(58) Field of Classification Search
CPC ... H04L 29/08; H04L 43/0888; H04L 47/193; H04L 47/2408; H04L 65/4084; H04L 65/608; H04L 65/80; H04L 67/025; H04L 67/108; H04L 67/16; H04L 67/42; H04L 69/16; H04L 69/24; H04L 1/0002; H04L 12/2856; H04L 12/5601; H04L 41/12;
(Continued)

(56) References Cited
U.S. PATENT DOCUMENTS 6,339,785 B1  1/2002 Feigenbaum
7,486,697 B2  2/2009 Fernandes et al.
(Continued)

*Primary Examiner* — Le H Luu
(74) *Attorney, Agent, or Firm* — Jefferson IP Law, LLP

(57) ABSTRACT

Provided is a method of multiple connection providing a service by a client, the method including: executing at least one application for providing a service; referring to a multiple connection history including information about the number of multiple connections and a size of a sub-segment; determining the number of multiple connections and the size of the sub-segment based on the referred-to multiple connection history; and requesting the multiple connections according to the determined number of multiple connections and the determined size of the sub-segment.

20 Claims, 20 Drawing Sheets

(51) Int. Cl.
*H04L 12/801* (2013.01)
*H04L 12/26* (2006.01)
*H04L 12/851* (2013.01)

(52) U.S. Cl.
CPC ........ *H04L 47/193* (2013.01); *H04L 47/2408* (2013.01); *H04L 65/4084* (2013.01); *H04L 65/608* (2013.01); *H04L 65/80* (2013.01); *H04L 67/108* (2013.01); *H04L 69/16* (2013.01); *H04L 69/24* (2013.01); *H04L 67/16* (2013.01); *H04L 67/42* (2013.01)

(58) Field of Classification Search
CPC ... H04L 43/067; H04L 47/2475; H04L 63/20; H04L 67/06; G06F 21/552; G06Q 10/06; G06Q 50/01; H03M 7/30; H04W 84/18
See application file for complete search history.

(56) References Cited

U.S. PATENT DOCUMENTS

| | | |
|---|---|---|
| 8,386,621 B2 | 2/2013 | Park et al. |
| 8,516,147 B2 | 8/2013 | Kaspar et al. |
| 8,798,061 B2 | 8/2014 | Kojima et al. |
| 2003/0223450 A1 | 12/2003 | Bender et al. |
| 2004/0133691 A1 | 7/2004 | Shimada |
| 2005/0060425 A1* | 3/2005 | Yeh ..................... H04L 12/2856 709/232 |
| 2006/0114889 A1* | 6/2006 | Schneider ........... H04L 12/5601 370/352 |
| 2006/0126521 A1* | 6/2006 | Hyndman ............... H04L 41/12 370/248 |
| 2007/0281720 A1* | 12/2007 | Lee ....................... H04W 84/18 455/466 |
| 2011/0029664 A1* | 2/2011 | Harrang ................ H04L 1/0002 709/224 |
| 2011/0276446 A1* | 11/2011 | Gupta .................... G06Q 10/06 705/34 |
| 2012/0300993 A1* | 11/2012 | Plamondon ............. H03M 7/30 382/124 |
| 2012/0327779 A1* | 12/2012 | Gell ..................... H04L 47/2475 370/238 |
| 2013/0079149 A1* | 3/2013 | Fletcher ................ G06Q 50/01 463/42 |
| 2013/0227634 A1* | 8/2013 | Pal ........................ G06F 21/552 726/1 |
| 2014/0136653 A1 | 5/2014 | Luby et al. |
| 2014/0258365 A1 | 9/2014 | L'Heureux et al. |
| 2015/0067819 A1* | 3/2015 | Shribman ............... H04L 67/06 726/12 |
| 2015/0085698 A1* | 3/2015 | Sella ..................... H04L 43/067 370/254 |
| 2015/0188949 A1* | 7/2015 | Mahaffey ............... H04L 63/20 726/1 |

\* cited by examiner

FIG. 8

| App | Domain | IP | Type | No | To | So |
|---|---|---|---|---|---|---|
| OTN | otn.com/sec/FW.dat | 10.231.113.250 | FD | 3 | 8.0 | 1.8 |
| MLB | mlb.com/lad/pro.ism/Manifest | 168.142.289.11 | SS | 6 | 10.4 | 0.8 |
| Fitness | fit.co.kr/da12/bbbfull.m3u8 | 165.213.45.220 | HLS | No | 10.4 | 1.2 |
| Web | http://www.youtube.com/watch?v=sf6uyGGsSlk | 173.194.127.101 | Web | 4 | 16 | 4 |

FD : FILE DOWNLOADING
SS : SMOOTH STREAMING
HLS : HTTP LIVE STREAMING
Web : WEB BROWSING

No : OPTIMUM NUMBER OF CONNECTIONS
To : TRANSMISSION RATE OF OPTIMUM
  NUMBER OF CONNECTIONS
  (MAXIMUM TRANSMISSION RATE)
So : OPTIMUM SIZE OF SUB-SEGMENT

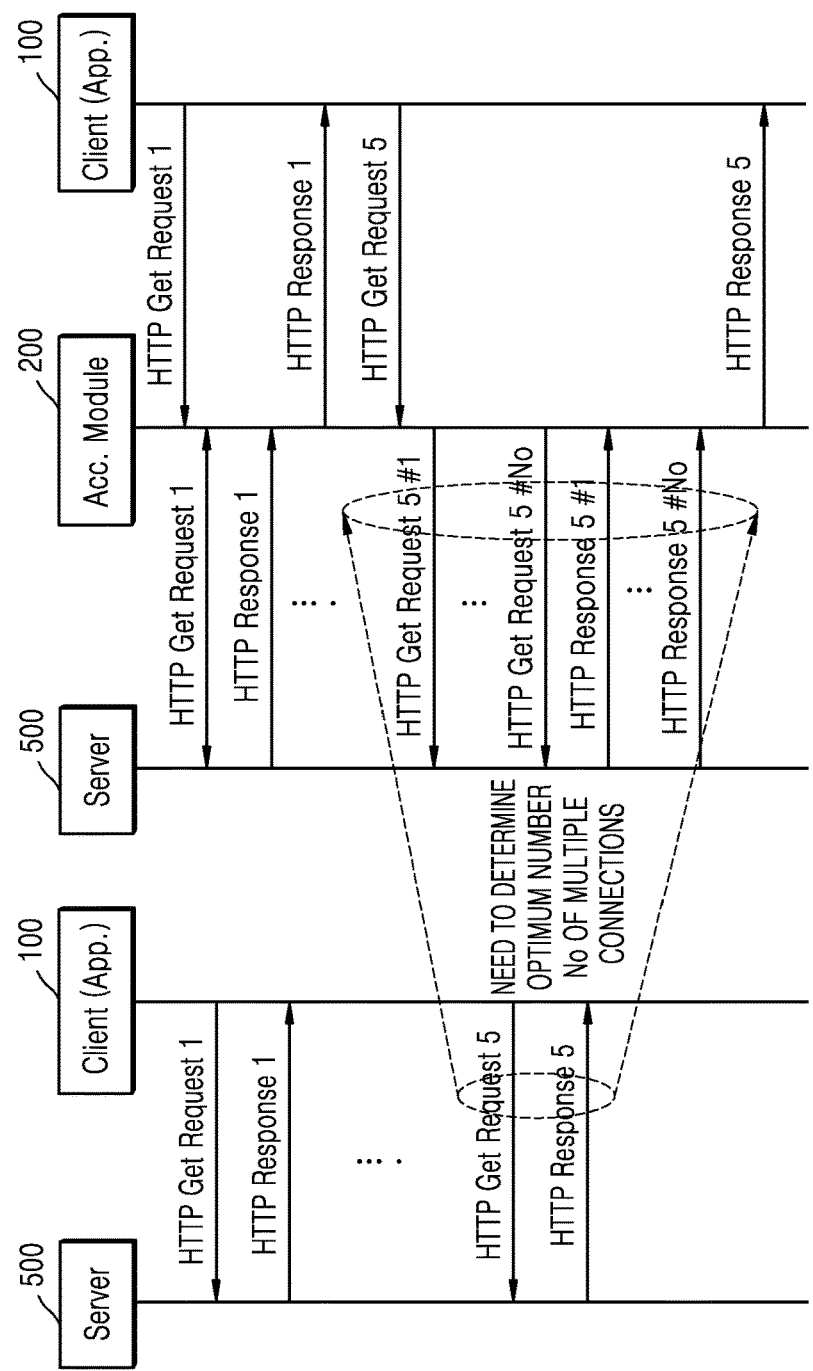

FIG. 10A

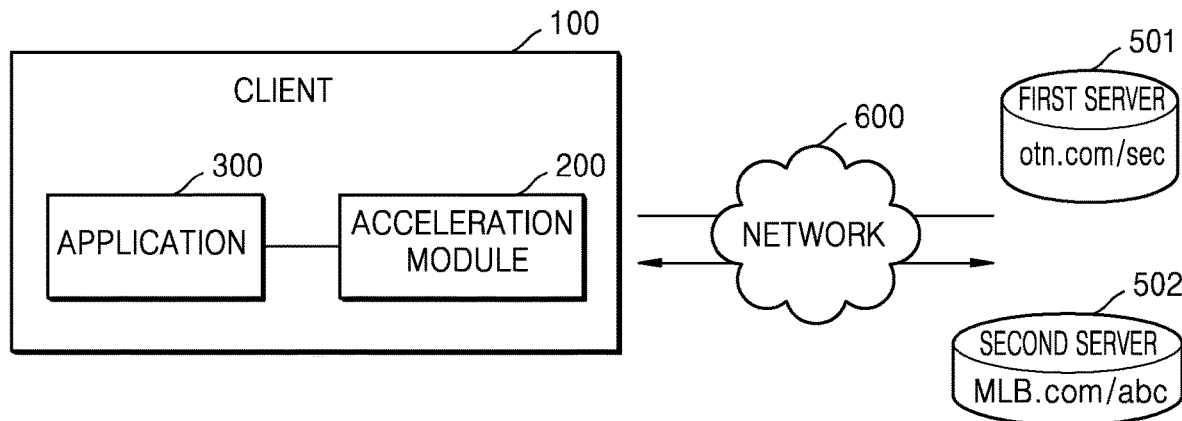

FIG. 10B

| App | Domain | IP | Type | No | To | So |
|---|---|---|---|---|---|---|
| OTN | otn.com/sec/ | 10.231.113.250 | FD | 10 | 8.0 | 1.8 |
| MLB | mlb.com/lad/ | 168.142.289.1 | SS | 6 | 10.4 | 0.8 |
| MLB | mlb.com/abc/ | 168.142.289.1 | SS | 15 | 10.4 | 1.2 |
| Fithness | fit.co.kr/da12/ | 165.213.45.220 | HLS | 1 | 5 | 1 |
| Fithness | fit.co.kr/da31/ | 165.213.45.230 | HLS | 4 | 12 | 0.8 |

FD : FILE DOWNLOADING
SS : SMOOTH STREAMING
HLS : HTTP LIVE STREAMING
Web : WEB BROWSING

No : OPTIMUM NUMBER OF CONNECTIONS
To : MAXIMUM SINGLE CONNECTION
 TRANSMISSION RATE
 (MAXIMUM TRANSMISSION RATE)
So : OPTIMUM NUMBER OF CONNECTIONS

- Nn : DETERMINED NUMBER OF MULTIPLE CONNECTIONS
- Nr : CURRENT NUMBER OF CONNECTIONS
- Tr : CURRENT TRANSMISSION RATE
- Tc : MAXIMUM SINGLE CONNECTION TRANSMISSION RATE (To / No)

No : OPTIMUM NUMBER OF CONNECTIONS

Ni : INITIAL NUMBER OF CONNECTIONS

To : MAXIMUM TRANSMISSION RATE

FIG. 12B

| MULTIPLE CONNECTION MODE | INITIAL MODE(IM) | OPTIMAL MODE (OM) | CONGESTION MODE(CM) | UPDATE MODE (UM) |
|---|---|---|---|---|
| DESCRIPTION | START TRANSMISSION BY USING ARBITRARY INITIAL VALUE | DETERMINE WHETHER CONNECTION STATE IS OPTIMUM | WHEN TRANSMISSION RATE IS SHARPLY DECREASED | WHEN OPTIMUM TRANSMISSION RATE NEEDS TO BE CHANGED |
| ENTRANCE | INITIAL NUMBER NI OF CONNECTIONS (Ni) | $Tr(No)$ (INCREASE NUMBER OF CONNECTIONS BY USING Pio) | CONDITION OF Tr $< Tm - \alpha \times Tc$ ($\alpha \fallingdotseq 1$) | $Tr > Tm + \beta * Tc$ |
| OPERATION | DETERMINE WHETHER SUITABLE Tr IS OUTPUT AFTER INITIAL CONNECTION | DETERMINE STATE TRANSITION THROUGH $Tr(No)$ | DETERMINE Nn BY USING Pco (SEARCH OM) | UPDATE No |
| CANCELATION | MOVE TO OPTIMAL MODE OM OR UPDATE MODE UM | MAINTAIN Nr (MAINTAIN OM), MOVE TO CM, MOVE TO UM | $Tr(No) > Tm - \alpha \cdot Tc$ | ESCAPE AFTER UPDATE |

_US 10,554,727 B2_

METHOD AND APPARATUS FOR CONTROLLING MULTI-CONNECTION FOR DATA TRANSMISSION RATE IMPROVEMENT

TECHNICAL FIELD

The present disclosure relates to methods and apparatuses for improving a data transmission rate by using multiple connections, and more particularly, to a method and apparatus for determining the optimum number of multiple connections for obtaining a maximum transmission rate and a size of a sub-segment to be transmitted through each of the multiple connections, by using a client-based multiple connection control table.

BACKGROUND ART

Multiple connection technology is used to improve a data transmission rate during a communication connection between a server and a client. In multiple connection technology, determining the number of multiple connections suitable for a network situation and determining a size of a sub-segment to be transmitted through each of the multiple connections are important.

A server-based multiple connection control method is a method of determining, by a server, the number of multiple connections and a size of a sub-segment by determining a network situation, wherein a probe signal is transmitted from the server to a client for available bandwidth prediction, and a network state indicator is derived by using the probe signal. However, according to such a method, the client is able to determine the number of multiple connections only when the client interworks with the server, and additional traffic is induced.

In a method of determining the optimum number of multiple connections for obtaining the maximum transmission rate, the optimum number of multiple connections is determined by monitoring a transmission rate while sequentially increasing the number of connections, but a long initial time is required for determining the optimum number of multiple connections.

DETAILED DESCRIPTION OF THE INVENTION

Technical Problem

Goals of the present disclosure are to solve the problems of the prior art and to provide a service to a user at a high speed by controlling multiple connections without having to interwork with a server based on a client and by finding the optimum number of multiple connections. Alternatively, goals of the present disclosure are to enable the client to quickly set multiple connections in a situation where a network environment is changed, by managing, by the server, multiple connection history information transmitted from the client.

Technical Solution

Representative configurations of the present disclosure for achieving the goals are as follows.

According to an aspect of an embodiment, a method of multiple connection providing a service by a client, the method includes: executing at least one application for providing a service; referring to a multiple connection history including information about the number of multiple connections and a size of a sub-segment; determining the number of multiple connections and the size of the sub-segment based on the referred-to multiple connection history; and requesting the multiple connections according to the determined number of multiple connections and the determined size of the sub-segment.

The method may further include determining a service type of the service provided by the at least one application, wherein the number of multiple connections and the size of the sub-segment may be determined based on the determined service type.

The determined number of multiple connections and the determined size of the sub-segment may be re-determined based on a segment size.

The method may further include determining the number of at least one link included in a webpage displayed on the at least one application, wherein the determining of the number of multiple connections may include determining the number of multiple connections respectively corresponding to the at least one link based on at least one of a type of a service provided by each of the at least one link and a size of data for the service provided by each of the at least one link.

When the number of the services to be provided is plural, the determining of the number of multiple connections may include determining the number of multiple connections to be requested for each of the plurality of services according to a service type determined with respect to each of the plurality of services to be provided.

The determining of the number of multiple connections may include: calculating a data transmission rate $T(N_i)$ with respect to the number Ni of multiple connections; increasing the number Ni to $N_i+\alpha$, and calculating a data transmission rate $T(N_i+\alpha)$ with respect to the increased number $N_i+\alpha$; comparing $T(N_i)$ and $T(N_i+\alpha)$; and determining the number No of the multiple connections to be Ni when $T(N_i+\alpha) \leq T(N_i)$ based on a result of the comparing, or determining the number No to be $N_i+N$ when $T(N_i+\alpha) > T(N_i)$ based on the result of the comparing, wherein N may be determined based on an increasing ratio of an average single reception rate $Tas(N_i+\alpha)$ when the number of multiple connections is $N_i+\alpha$ and an average single reception rate $Tas(N_i)$ when the number of multiple connections is i.e., based on $\beta = Tas(N_i+\alpha)/Tas(N_i)$.

The number of multiple connections may be determined based on a multi-transmission mode.

The multi-transmission mode may include at least one of an initial mode, an optimal mode, a congestion mode, and an update mode.

The number of multiple connections may be determined based on an arrival time difference $dPAT_i$ of an $i^{th}$ packet received by the client, wherein $dPAT_i = PAT_{i+1} - PAT_i$, wherein $PAT_i$ may denote a time when the $i^{th}$ packet is received.

The determining of the number of multiple connections may include: obtaining the arrival time difference $dPAT_i$; generating a first threshold value $T_1$ and a second threshold value $T_2$ by using the obtained $dPAT_i$; and updating the first and second threshold values $T_1$ and $T_2$, wherein when an arrival time difference of a current packet is smaller than the first threshold value $T_1$, the number of multiple connections may be increased, and when the arrival time difference of the current packet is greater than the second threshold value $T_2$, the number of multiple connections may be decreased.

The first threshold value $T_1$ may denote a packet arrival time difference in which a Bayes error rate of a proportion of samples having $dPAT_i$ greater than the first threshold value $T_1$ from among $dPAT_i$ samples ω1 obtained while the number of multiple connections is increasing and Bayes error rate of a proportion of samples having $dPAT_i$ smaller than the first threshold value $T_1$ from among $dPAT_i$ samples ω2 obtained while the number of multiple connections is maintained are minimum, and the second threshold value $T_2$ may denote a packet arrival time difference in which a Bayes error rate of a proportion of samples having $dPAT_i$ greater than the second threshold value $T_2$ from among the ω2 and a Bayes error rate of a proportion of samples having $dPAT_i$ smaller than the second threshold value $T_2$ from among $dPAT_i$ samples ω3 obtained while the number of multiple connections is decreasing are minimum.

When $T_1 = e^{l_1}$, $l_1 = \dfrac{-b_1 \pm \sqrt{b_1^2 - 4a_1c_1}}{2a_1}$ ($\beta_1 \neq \beta_2$), $a_1 = \dfrac{1}{\beta_2^2} - \dfrac{1}{\beta_1^2}$, $b_1 = -2\left(\dfrac{\alpha_2}{\beta_2^2} - \dfrac{\alpha_1}{\beta_1^2}\right)$, and $c_1 = \dfrac{\alpha_2^2}{\beta_2^2} - \dfrac{\alpha_1^2}{\beta_1^2} + \ln\left(\dfrac{K\beta_2}{L\beta_1}\right)^2$, when $T_2 = e^{l_2}$, $l_2 = \dfrac{-b_2 \pm \sqrt{b_2^2 - 4a_2c_2}}{2a_2}$ ($\beta_2 \neq \beta_3$), $a_2 = \dfrac{1}{\beta_3^2} - \dfrac{1}{\beta_2^2}$, $b_2 = -2\left(\dfrac{\alpha_3}{\beta_3^2} - \dfrac{\alpha_2}{\beta_2^2}\right)$, and $c_2 = \dfrac{\alpha_3^2}{\beta_3^2} - \dfrac{\alpha_2^2}{\beta_2^2} + \ln\left(\dfrac{K\beta_3}{L\beta_2}\right)^2$, wherein $\alpha_i = \dfrac{1}{N_i}\sum_{j=1}^{N_i}\ln(x_j)$, $\beta_i = \sqrt{\dfrac{1}{N_i-1}\sum_{j=1}^{N_i}(\ln(x_i) - \alpha_i)^2}$, and $(x_j \in \omega_i)$.

According to an aspect of another embodiment, a method of multiple connection providing a service by a client, the method includes: receiving a multiple connection history from at least one client; classifying the received multiple connection history; determining a representative multiple connection setting based on the classified multiple connection history; storing the determined representative multiple connection setting; receiving a transmission request of the representative multiple connection setting; and transmitting the representative multiple connection setting whose transmission request is received.

According to an aspect of another embodiment, a client apparatus multi-connecting to provide a service, the client apparatus includes: an application executor configured to execute at least one application for providing a service; a storage configured to store a multiple connection history including information about the number of multiple connections and a size of a sub-segment; a determiner configured to refer to the stored multiple connection history and determine the number of multiple connections and the size of the sub-segment based on the referred multiple connection history; and a transmitter configured to transmit a multiple connection request according to the determined number of multiple connections and the determined size of the sub-segment.

The determiner may determine a service type of the service provided by the at least one application and determine the number of multiple connections and a size of a sub-segment based on the determined service type.

The determiner may re-determine the number of multiple connections and the size of the sub-segment based on a segment size.

The determiner may determine the number of at least one link included in a webpage displayed on the at least one application, and determine the number of multiple connections respectively corresponding to the at least one link based on at least one of a type of a service provided by each of the at least one link and a size of data for the service provided by each of the at least one link.

When there are a plurality of services to be provided, the determiner determines the number of multiple connections to be requested to each of the plurality of services according to a service type determined with respect to each of the plurality of services to be provided.

The determiner may calculate a data transmission rate $T(N_i)$ connected to the number Ni of multiple connections and a data transmission rate $T(N_i+\alpha)$ connected to an increased number $N_i+\alpha$, and compare $T(N_i)$ and $T(N_i+\alpha)$ to determine the number No of the multiple connections to be Ni when $T(N_i+\alpha) \leq T(N_i)$ and determine the number No to be $N_i+N$ when $T(N_i+\alpha) > T(N_i)$, wherein N is determined based on an increasing ratio of an average single reception rate $Tas(N_i+\alpha)$ when the number of multiple connections is $N_i+\alpha$ and an average single reception rate $Tas(N_i)$ when the number of multiple connections is $N_i$.

The number of multiple connections may be determined based on a multi-transmission mode.

The multi-transmission mode may include at least one of an initial mode, an optimal mode, a congestion mode, and an update mode.

The number of multiple connections may be determined based on an arrival time difference $dPAT_i$ of an $i^{th}$ packet received by the client, wherein $dPAT_i = PAT_{i+1} - PAT_i$, wherein $PAT_i$ denotes a time when the $i^{th}$ packet is received.

The determiner may collect the $dPAT_i$, generate a first threshold value $T_1$ and a second threshold value $T_2$ by using the collected $dPAT_i$, update the $T_1$ and the $T_2$, increase the number of multiple connections when an arrival time difference of a current packet is smaller than the $T_1$, and decrease the number of multiple connections when the arrival time difference of the current packet is greater than the $T_2$.

The $T_1$ may denote a packet arrival time difference in which a Bayes error rate of a proportion of samples having $dPAT_i$ greater than the $T_1$ from among $dPAT_i$ samples ω1 collected while the number of multiple connections is increasing and Bayes error rate of a proportion of samples having $dPAT_i$ smaller than the $T_1$ from among $dPAT_i$ samples ω2 collected while the number of multiple connections is maintained are minimum, and the $T_2$ may denote a packet arrival time difference in which a Bayes error rate of a proportion of samples having $dPAT_i$ greater than the $T_2$ from among the ω2 and a Bayes error rate of a proportion of samples having $dPAT_i$ smaller than the $T_2$ from among $dPAT_i$ samples ω3 collected while the number of multiple connections is decreasing are minimum.

When $T_1 = e^{l_1}$, $l_1 = \dfrac{-b_1 \pm \sqrt{b_1^2 - 4a_1c_1}}{2a_1}$ ($\beta_1 \neq \beta_2$), $a_1 = \dfrac{1}{\beta_2^2} - \dfrac{1}{\beta_1^2}$, $b_1 = -2\left(\dfrac{\alpha_2}{\beta_2^2} - \dfrac{\alpha_1}{\beta_1^2}\right)$, and $c_1 = \dfrac{\alpha_2^2}{\beta_2^2} - \dfrac{\alpha_1^2}{\beta_1^2} + \ln\left(\dfrac{K\beta_2}{L\beta_1}\right)^2$, when $T_2 = e^{l_2}$, -continued $$l_2 = \frac{-b_2 \pm \sqrt{b_2^2 - 4a_2c_2}}{2a_2} (\beta_2 \neq \beta_3), a_2 = \frac{1}{\beta_3^2} - \frac{1}{\beta_2^2},$$

$$b_2 = -2\left(\frac{\alpha_3}{\beta_3^2} - \frac{\alpha_2}{\beta_2^2}\right), \text{ and } c_2 = \frac{\alpha_3^2}{\beta_3^2} - \frac{\alpha_2^2}{\beta_2^2} + \ln\left(\frac{K\beta_3}{L\beta_2}\right)^2, \text{ wherein}$$

$$\alpha_i = \frac{1}{N_i}\sum_{j=1}^{N_i}\ln(x_j), \beta_i = \sqrt{\frac{1}{N_i-1}\sum_{j=1}^{N_i}(\ln(x_i)-\alpha_i)^2}, \text{ and } (x_j \in \omega_i).$$

According to an aspect of another embodiment, a server multi-connecting to provide a service to the client, the server includes: a receiver configured to receive a multiple connection history from at least one client; a controller configured to classify the received multiple connection history and determine a representative multiple connection setting based on the classified multiple connection history; a storage configured to store the determined representative multiple connection setting; and a transmitter configured to transmit the representative multiple connection setting when the receiver receives a transmission request of the representative multiple connection setting.

According to an aspect of another embodiment, a computer-readable recording medium has recorded thereon a computer program for executing the multiple connection method.

According to one or more embodiments, there are further provided other methods, other systems, and non-transitory computer-readable recording media having recorded thereon a computer program for executing the other methods to realize the present disclosure.

Advantageous Effects of the Invention

According to the present disclosure, a service may be provided to a user at a high speed by controlling multiple connections without having to interwork with a server based on a client, and by finding the optimum number of multiple connections.

DESCRIPTION OF THE DRAWINGS

FIG. 8 illustrates an example of a multiple connection table, in which a multiple connection history for determining the optimum number of multiple connections and an optimum segment size according to a type of a service is stored, according to an embodiment of the present disclosure.

FIG. 9A is a diagram of a layout of a webpage, according to an embodiment of the present disclosure.

FIG. 9B is a diagram illustrating server-client operations when a single connection is used to provide the webpage of FIG. 9A.

FIG. 9C is a diagram illustrating server-client operations when the optimum number of multiple connections is determined and multiple connections are used to provide the webpage of FIG. 9A.

FIG. 10A is a diagram for describing a method of determining the number of multiple connections by using a multiple connection history, according to another embodiment of the present disclosure.

FIG. 10B is a multiple connection table including multiple connection information, used in a method of determining the number of multiple connections by using a multiple connection history, according to another embodiment of the present disclosure.

FIG. 12B is a diagram for describing each multiple connection mode in a method of determining the number of multiple connections by using a state of a multiple connection mode, according to another embodiment of the present disclosure.

BEST MODE

Figure 1A:
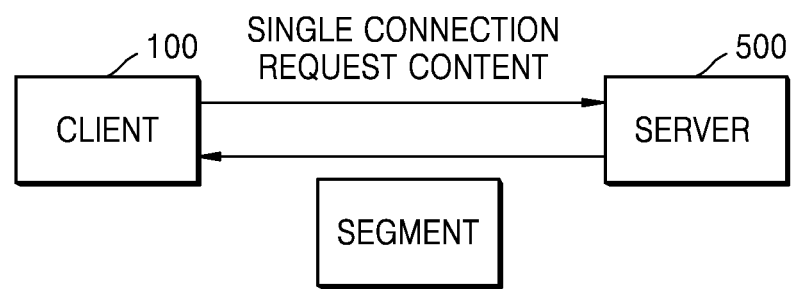
FIG. 1A is a block diagram regarding an operation of requesting content through a single connection between a server and a client.

According to an aspect of an embodiment, a method of multiple connection providing a service by a client, the method includes: executing at least one application for providing a service; referring to a multiple connection history including information about the number of multiple connections and a size of a sub-segment; determining the number of multiple connections and the size of the sub-segment based on the referred-to multiple connection history; and requesting the multiple connections according to the determined number of multiple connections and the determined size of the sub-segment.

MODE OF THE INVENTION

Detailed descriptions about the present disclosure refer to accompanying drawings illustrating, as examples, particular embodiments for executing the present disclosure. Such embodiments are described in sufficient detail such that one of ordinary skill in the art is able to execute the present disclosure. It should be understood that various embodiments of the present disclosure are different from each other but are not necessarily mutually exclusive.

For example, particular shapes, structures, and features described in the specification may be embodied by being changed from one embodiment to another embodiment without departing from the spirit and scope of the present disclosure. Also, it should be understood that locations or arrangements of individual components in each embodiment may also be changed without departing from the spirit and scope of the present disclosure. Accordingly, the following detailed descriptions do not have limited meanings, and it will be understood that the scope of the present disclosure include the scope of the appended claims and other equivalent scope.

In drawings, similar reference numerals denote the same or similar elements throughout various aspects. Also, elements not related to the present disclosure are omitted in the drawings for clarity, and like reference numerals refer to like elements throughout the specification.

Hereinafter, embodiments the present disclosure will be described more fully with reference to the accompanying drawings to be easily executed by one of ordinary skill in the art. However, the present disclosure may be embodied in many different forms and should not be construed as limited to embodiments set forth herein.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

Hereinafter, the present disclosure will be described in detail with reference to accompanying drawings.

FIG. 1 is diagrams illustrating a single connection and multiple connections for data transmission between a server and a client.

FIG. 1A is a block diagram regarding an operation of requesting content through a single connection between a server and a client.

When a service providing request of a user is input, a client 100 requests a server 500 to transmit content for service provision through a single connection, and the server transmits a content segment to the client through the single connection. The content segment is obtained by splitting data of content to be transmitted, and is a unit for transmitting and storing the data.

Figure 1B:
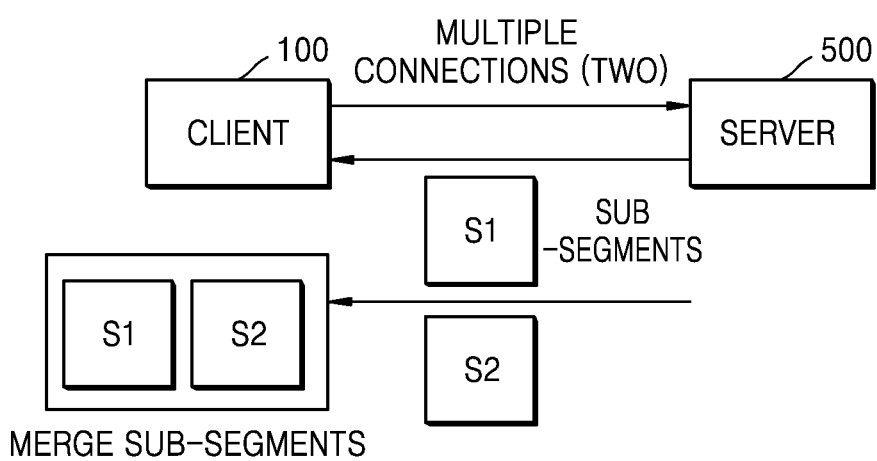
FIG. 1B is a block diagram regarding an operation of requesting content through multiple connections between a server and a client.

FIG. 1B is a block diagram regarding an operation of requesting content through multiple connections between a server and a client.

In FIG. 1B, when the client 100 requests the server 500 to transmit connect through two multiple connections, the server 500 sets the two multiple connections with the client 100, and independently transmits two sub-segments S1 and S2 respectively through the two multiple connections. Upon receiving the sub-segments S1 and S2, the client restores a segment by merging the received sub-segments S1 and S2.

Since utilization of a single connection is reduced in a network situation where a long delay or a high packet loss occur, when sub-segments obtained by splitting a segment are transmitted through multiple connections, a transmission rate may be increased compared to the single connection.

Figure 2:
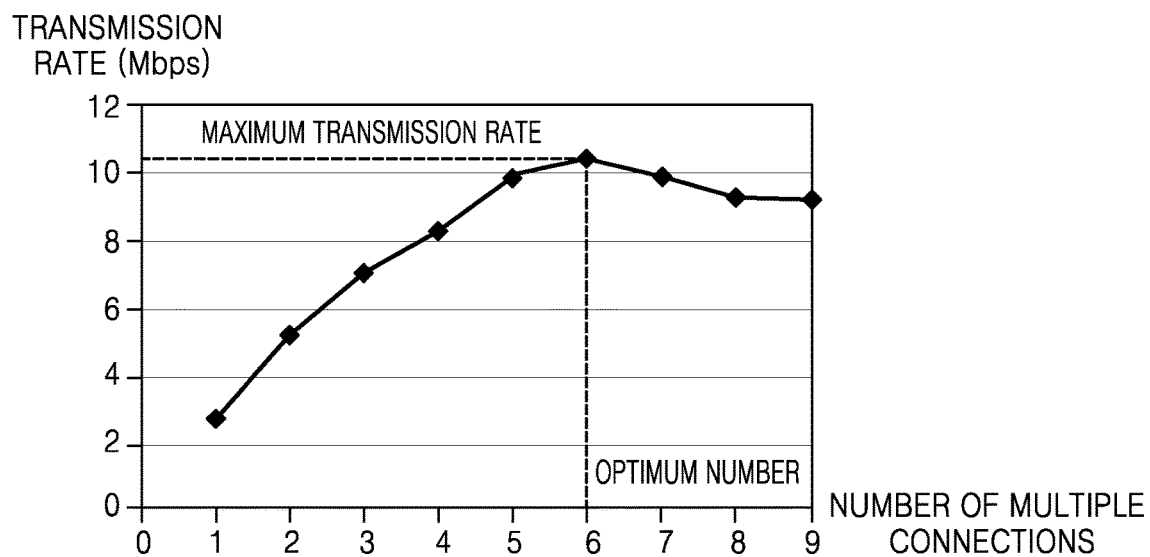
FIG. 2 is a diagram illustrating a graph regarding a relationship between the number of multiple connections and a data transmission rate.

FIG. 2 is a diagram illustrating a graph regarding a relationship between the number of multiple connections and a data transmission rate.

As described above, when utilization of a single connection is low, transmission rate may be increased by transmitting data through multiple connections. However, resources usable in a network connecting a transmitting device and a receiving device are finite and have a trade-off relationship, and thus a large number of multiple connections does not necessarily guarantee a high transmission rate.

Referring to FIG. 2, when the number of multiple connections is smaller than or equal to 6, a transmission rate is increased as the number of multiple connections increase from a single connection. However, the increase of the transmission rate is large when the number of multiple connections is small, but the increase of the transmission rate tends to decrease as the number of multiple connections increases. Also, when the number of multiple connections is equal to or greater than 7, the transmission rate rather decreases.

This is because, for multiple connections between the transmitting device and the receiving device, a segment is split into sub-segments and then transmitted, and in this case, data, such as a header, a tail, etc. is added for data packets forming each sub-segment, and an amount of such data increases when N, i.e., the number of multiple connections, increases.

Also, when multiple connections are used, system complexity increases because a link protocol needs to be set with respect to each of the multiple connections and separate processes for data split and recombination need to be performed, and thus an overall system performance may be affected.

Also, since network resources limited as described above are distributed and used for multiple connections, a large number of multiple connections does not necessarily guarantee a high transmission rate.

For example, when a frequency band is to be split and used for multiple connections, a frequency band twice the width of a data frequency bandwidth to be transmitted is required, and if the number of multiple connections is large, a sufficient frequency band for transmitting sub-segments may not be secured. Alternatively, also in a case where a time is to be split and used for multiple connections, when the number of multiple connections is large, a sufficient time for transmitting sub-segments may not be guaranteed.

In FIG. 2, the optimum number of multiple connections for obtaining the maximum transmission rate is 6, and a high transmission rate may be obtained if such an optimum number of multiple connections is determined as fast as possible.

Figure 3:
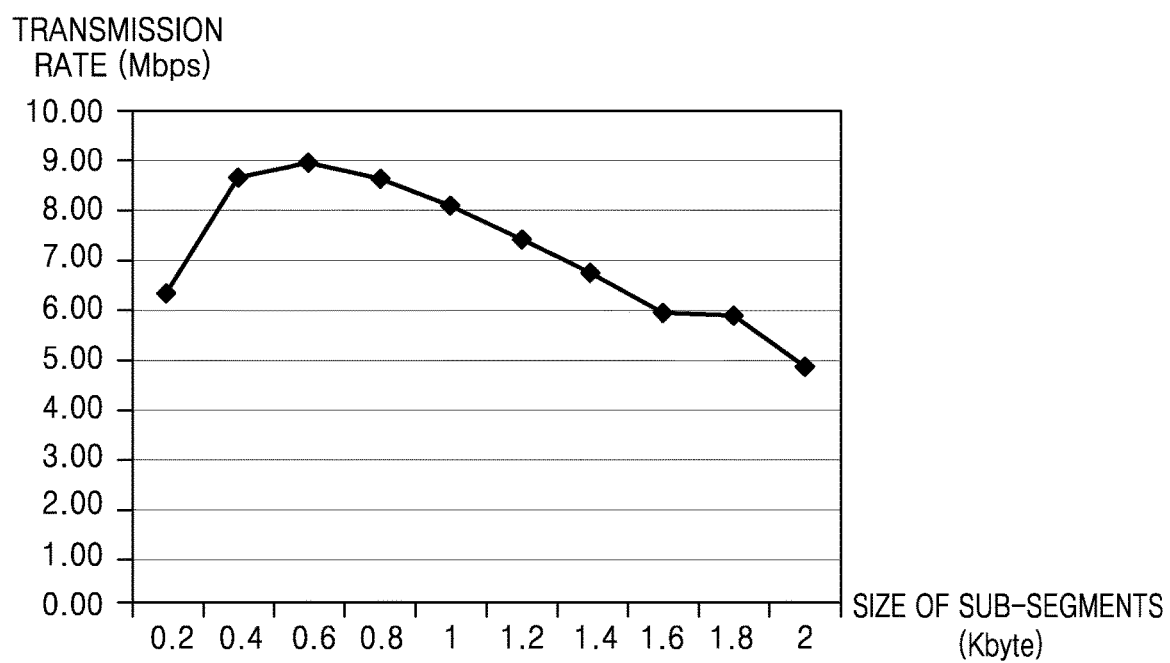
FIG. 3 is a diagram illustrating a graph regarding a relationship between a size of a sub-segment and a data transmission rate.

FIG. 3 is a diagram illustrating a graph regarding a relationship between a size of a sub-segment and a data transmission rate.

When the number of transmitting devices and the number of receiving devices connected via multiple connections are the same, the data transmission rate may be increased as the size of the sub-segment increases if a network environment is idealistic. However, in an actual network environment, not only an error is generated due to factors, such as noise, interference, etc. caused by external factors, but also fading may occur according to a communication channel state, and a communication environment may rapidly deteriorate if a client terminal enters a shadow zone.

When the size of the sub-segment, i.e., a data transmission unit, is large in such a situation, a possibility that an error will be generated in one packet or sub-segment is rather high, and thus a data restoration efficiency using an error correcting code or the like is low.

Also, when the size of the sub-segment is decreased, a segment is split into a higher number of sub-segments to transmit the segment of the same size, and thus more supplementary data for forming the sub-segments is required and a time delay for transmitting the sub-segments may occur.

FIG. 3 illustrates a transmission rate according to the size of each sub-segment when the size of the sub-segment increases by 0.2 kbyte from 0.2 kbyte. As described above, the data transmission rate is increased as the size of the sub-segment increases until the size of the sub-segment is 0.6, but a rate of increase gradually decreases, and the data transmission rate is rather decreased when the size of the sub-segment is equal to or larger than 0.8.

Figure 4:
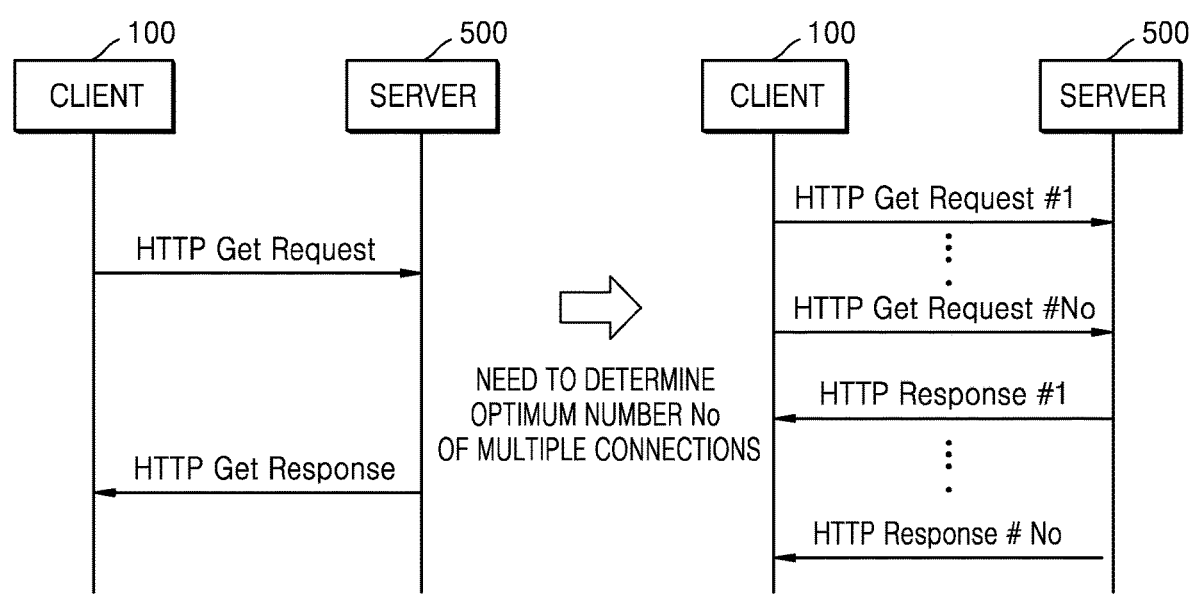
FIG. 4 illustrates processes of exchanging, by a client, an HTTP request and a response with a server so as to provide a service.

FIG. 4 illustrates processes of exchanging, by a client, an HTTP request and a response with a server so as to provide a service.

Considering the relationship between the number of multiple connections and the transmission rate of FIG. 2 and the relationship between the size of the sub-segment and the transmission rate of FIG. 3, it is required to determine the optimum number of multiple connections and the optimum size of the sub-segment so as to obtain a high data transmission rate.

FIG. 4 illustrates processes of the client requesting the server to connect and transmit data by using a hyper-text transfer protocol (HTTP), and receiving a response from the server, when the client and the server are connected via an Internet network.

When the server and the client are connected via a single connection, the client transmits one HTTP get request to the server and receives one HTTP get response from the server. On the other hand, when the server and the client are connected via multiple connections, the client transmits HTTP get requests corresponding to the number N of multiple connections to the server and receives HTTP get responses corresponding to the number N of multiple connections from the server.

FIG. 5 is graphs regarding a relationship between the number of times multiple connections are controlled and a transmission rate, when the optimum number of multiple connections is determined according to an embodiment of the present disclosure.

As checked in FIG. 2, the transmission rate is increased as the as the number of connections increases in the beginning of measurement where the number of connections is small, but the increase of the transmission rate is gradually reduced and when the number of connections is equal to or greater than a certain level, the increase of the transmission rate is saturated and thus is no longer increased or is rather decreased.

In conventional technology, when multiple connections are required between a server and a client, a transmission rate is measured while increasing the number of connections one by one from a single connection so as to determine the optimum number of multiple connections for obtaining the highest transmission rate. For example, a transmission rate $T(N)$ when the number of connections is N and a transmission rate $T(N+1)$ when the number of connections is N+1 by increasing the number of connections by 1 are compared, and when $T(N+1)$ drastically lower than $T(N)$, the N at this time is determined as the optimum number $N_o$ of multiple connections.

Figure 5A:
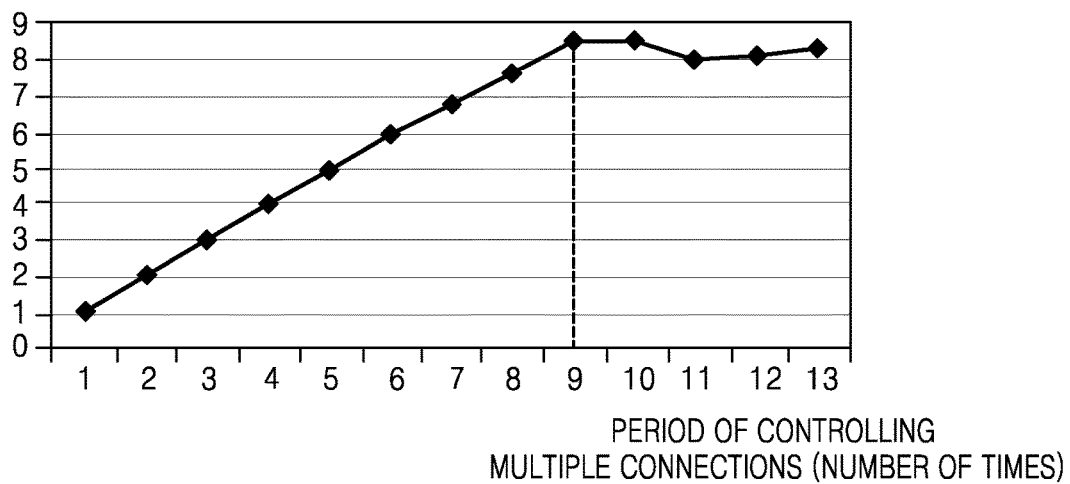
FIG. 5A is a diagram illustrating a relationship between the number of times multiple connections are controlled and a transmission rate, when the optimum number of multiple connections is determined by increasing the number of single connections one by one.

Here, when the optimum number $N_o$ is searched for from the optimum transmission rate by increasing the number of single connections as in the conventional technology, a process of controlling multiple connections is performed $N_o-1$ times, and thus the process of controlling multiple connections is performed 8 times so as to find 9, i.e., the optimum number of multiple connections as in FIG. 5A. When the optimum number $N_o$ of multiple connections is large, the number of times the multiple connections are controlled for determining the optimum number $N_o$ is also increased, and thus an initial time for determining $N_o$ is increased.

Figure 5B:
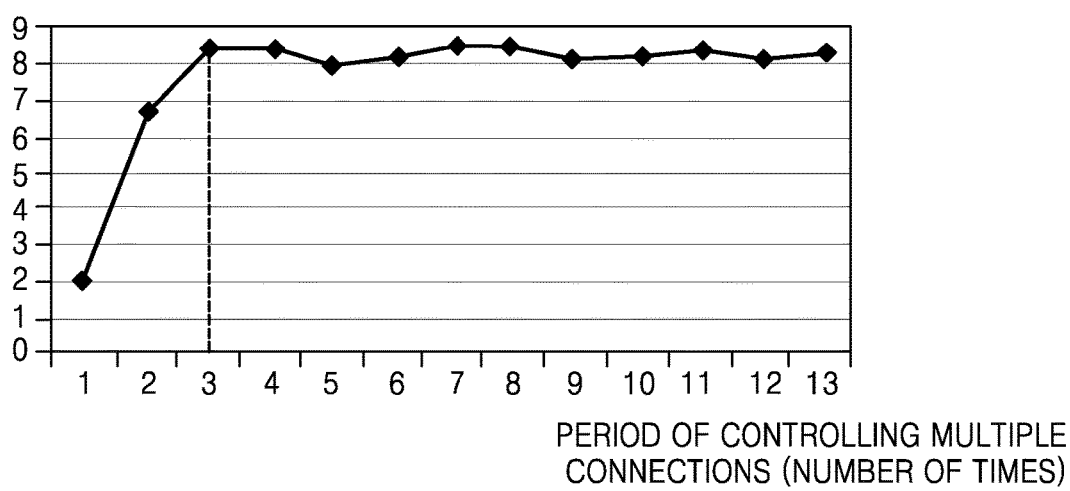
FIG. 5B is a diagram illustrating a relationship between the number of times multiple connections are controlled and a transmission rate, when the optimum number of multiple connections is determined according to an embodiment of the present disclosure.

FIG. 5B experimentally shows a relationship between the number of times multiple connections are controlled and a transmission rate when the optimum number of multiple connections is searched for according to an embodiment of the present disclosure, wherein the optimum number of multiple connections is found and the maximum transmission rate is shown only by controlling the multiple connections three times, which is much lower than FIG. 5A.

Hereinafter, determining the optimum number of multiple connections and determining a size of a sub-segment according to embodiments of the present disclosure will be described in detail.

Figure 6:
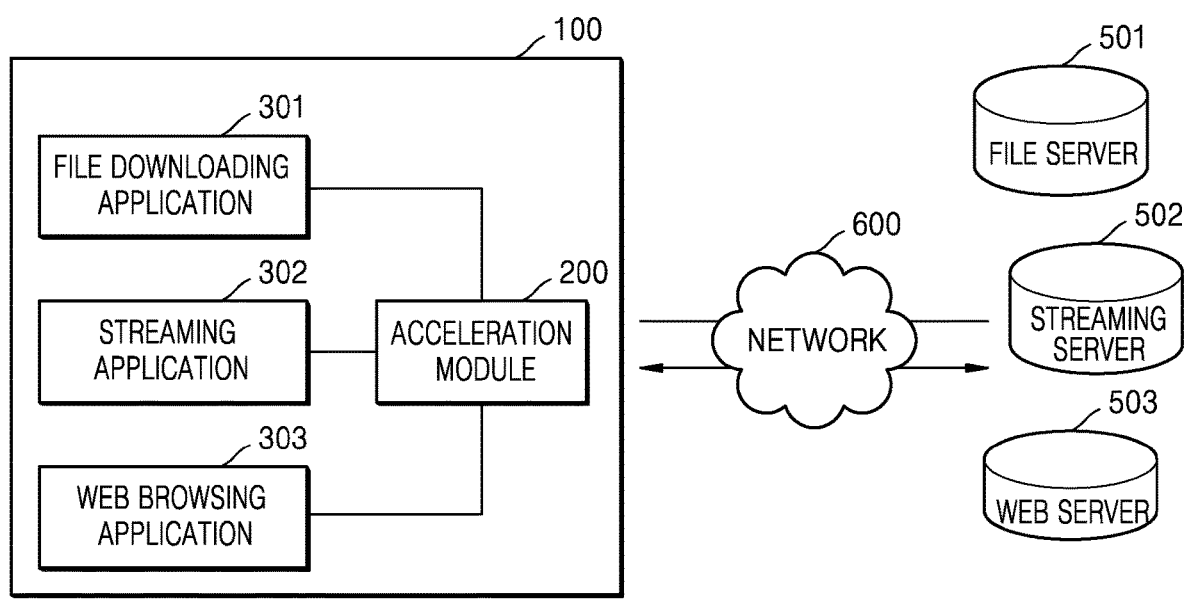
FIG. 6 is an overall overview of a client-server system according to an embodiment of the present disclosure.

FIG. 6 is an overall overview of a client-server system according to an embodiment of the present disclosure.

As shown in FIG. 6, the client-server system according to an embodiment of the present disclosure includes the client 100, the server 500, and a network 600.

The client 100 is an apparatus capable of executing an application, such as a mobile phone, a smart phone, a personal digital assistant (PDA), a PDA phone, a laptop computer, or a smart TV, and may be any type of apparatuses connected to the server 500 through a network. A representative example of the client 100 is a smart phone, wherein various functions, in addition to a mobile phone function, are integrated in the smart phone and thus the smart phone is suitable for performing functions of PDA or a small PC.

The server 500 may include a file server 501, a streaming server 502, and a web server 503 according to types of services provided by the server, but is not limited thereto.

The network connects the client 100 and the server 500. The network 600 includes an exclusive line, LAN, VAN, Intra net, a private telephone network, a public telephone network, a PSTN network, or a combination thereof, is a data communication network having a comprehensive meaning enabling network subjects shown in FIG. 6 to smoothly communicate with each other, and may include wired Internet, wireless Internet, or a mobile wireless communication network.

A user uses different types of applications according to types of services to be provided, and may use a downloading application 301 to download a file in the file server 501 to the client and may use a streaming application 302 to stream a media file in the streaming server 502. Also, a web browsing application 303 may be used for Internet surfing to check content in the web server 503 through a web browser screen.

Here, FIG. 6 illustrates different applications according to types of services, but according to an embodiment, the user may select several types of services in one application, or one server may provide various types of services.

As such, the user may select a service to be provided through an application installed in the client, and the application transmits a service request to an acceleration module 200 when the user requests the service. Upon receiving the service request from the application, the acceleration module 200 analyzes a type of the requested service, determines the number of multiple connections suitable to the analyzed type, and requests the server for multiple connections.

Figure 7:
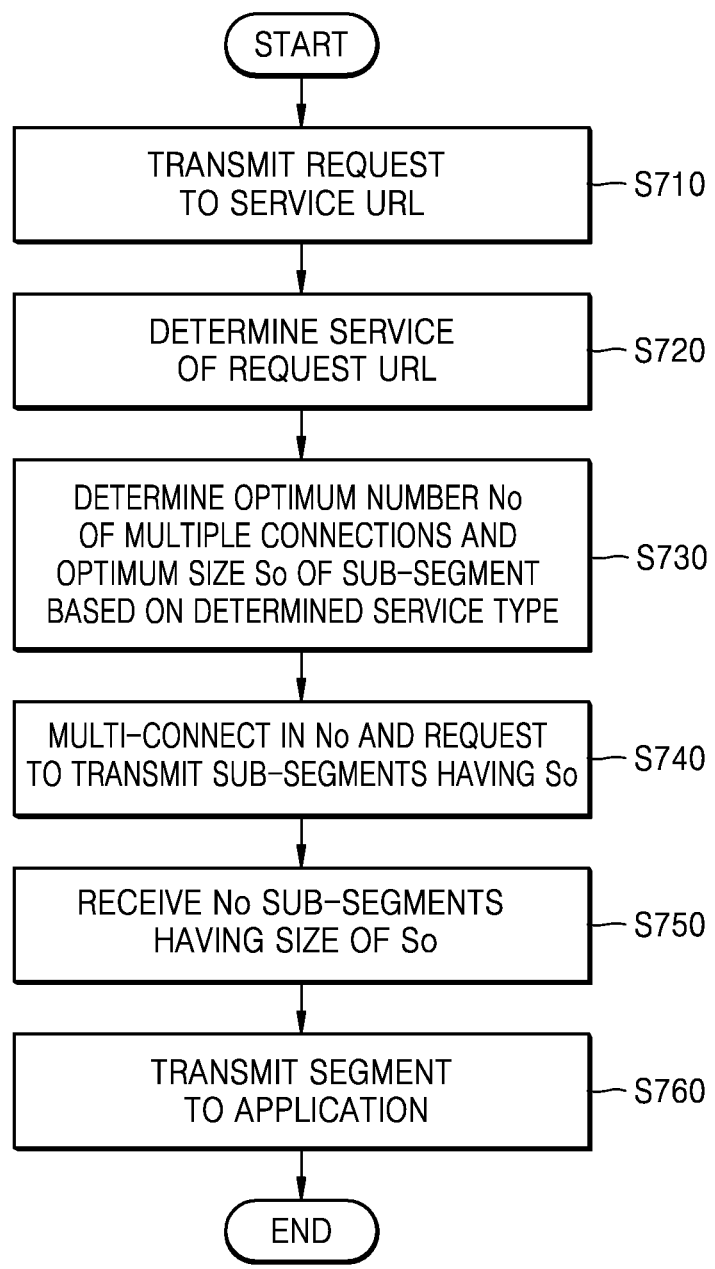
FIG. 7 is a flowchart of a method of determining the number of multiple connections based on a service type, according to an embodiment of the present disclosure.

FIG. 7 is a flowchart of a method of determining the number of multiple connections based on a service type, according to an embodiment of the present disclosure.

When a service providing request of a user is input through an application 300, the acceleration module 200 transmits a HTTP get request to a service URL included in the service providing request, in operation S710. The acceleration module 200 determines a service type of a URL that requested the HTTP get request in operation S720, and determines the optimum number $N_o$ of multiple connections and the optimum size $S_o$ of a sub-segment in operation S730 based on the determined service type.

Since a size of data to be transmitted varies according to a service type to be provided by a client, the number of multiple connections and a size of a sub-segment need to be determined according to the service type.

For example, the number of multiple connections may be determined to be small because a large amount of data usually does not need to be transmitted for a service, such as Internet surfing through a web browser, and the number of multiple connections may be determined to be large when a file is downloaded. Also, when the optimum number of multiple connections suitable for a streaming service is to be determined because a large amount of data needs to be continuously transmitted and segment combination is performed in real-time during a streaming service, the optimum number of multiple connections that provides a smooth streaming service while increasing a data transmission rate may be determined.

When the optimum number $N_o$ of multiple connections is determined, the acceleration engine is connected to the server in the determined optimum number $N_o$ of multiple connections and requests the server to transmit $N_o$ sub-segments having the size of $S_o$, in operation S740. Then, when the acceleration engine is connected to the server in the number $N_o$ of multiple connections, the acceleration engine receives the $N_o$ sub-segments having the size of $S_o$ from the server in response to the request in operation S750, and forms a segment by combining the $N_o$ sub-segments and transmits the formed segment to the application in operation S760.

The application provides the service to the user by using the received segment.

Here, the acceleration module determines the number of multiple connections and the size of the sub-segment by referring to a multiple connection history stored in the client 100, and FIG. 8 illustrates an example of a multiple connection table, in which a multiple connection history for determining the optimum number of multiple connections and an optimum size of a sub-segment according to a service type is stored, according to an embodiment of the present disclosure.

Since the client stores and manages a multiple connection history, the number of multiple connections may be determined based on the client without having to collect information to determine the optimum number of multiple connections, or receive separate control data from the server.

FIG. 8 illustrates the multiple connection table, in which the multiple connection history for determining the optimum number of multiple connections and the optimum segment size according to a type of a service is stored, according to an embodiment of the present disclosure.

As shown in FIG. 8, the multiple connection table may include a service address, such as a domain or Internet protocol (IP) address, for requesting a service by each application, a type of a service, the optimum number $N_o$ of connections, a transmission rate (maximum transmission rate) $T_o$ of the optimum number of connections, and an optimum size $S_o$ of a sub-segment.

It is assumed that there are an OTN application providing a file downloading service FD, an MLB application providing a smooth streaming service SS, a fitness application providing a HTTP live streaming service HLS, and a web application providing a web browsing service Web in the embodiment of FIG. 8.

In the OTN application, the file downloading service is provided, the optimum number $N_o$ of multiple connections for receiving the file downloading service from the corresponding service address is 3, the transmission rate $T_o$ of 3 multiple connections is 8.0 Mbps, and the optimum size $S_o$ of a sub-segment is 1.8 kbyte. In the MLB application, the smooth streaming service is provided, the optimum number $N_o$ of multiple connections for receiving the smooth streaming service from the corresponding service address is 6, the transmission rate $T_o$ of 6 multiple connections is 10.4 Mbps, and the optimum size $S_o$ of a sub-segment is 0.8 kbyte.

In the fitness application, the HTTP live streaming service is provided, the optimum number $N_o$ of multiple connections for receiving the HTTP live streaming service from the corresponding service address is 1, the transmission rate $T_o$ of 1 single connection is 1 Mbps, and the optimum size $S_o$ of a sub-segment is 1 kbyte.

Lastly, in the web application, the web browsing service is provided, the optimum number $N_o$ of multiple connections for receiving the web browsing service from the corresponding service address is 4, the transmission rate $T_o$ of 4 multiple connections is 16 Mbps, and the optimum size $S_o$ of a sub-segment is 4 kbyte.

For example, let's assume that a user is to watch a baseball game through the MLB application. According to conventional technology, when there is a VOD reproduction request of the user, one connection or a small number of connections is requested from a server regardless of a service type, and the optimum number of multiple connections having the highest transmission rate and the optimum size of a sub-segment are determined while increasing the number of connections one by one.

However, according to an embodiment of the present disclosure, a service address and a service type are determined first from a service request transmitted through the MLB application. Since the service type is smooth streaming based on the result of determination, the optimum number $N_o$ of connections is determined to be 6 and the optimum size $S_o$ of sub-segment is determined to be 0.8 kbyte by referring to the multiple connection table.

Alternatively, in case of a service request whose service address is not registered in the multiple connection table, the optimum number of multiple connections of a service having the same service type may be referred to from among services registered in the multiple connection table based on a determined service type.

Alternatively, when a service address is not included in items of the multiple connection table, the optimum number of multiple connections and an optimum size of a sub-segment may be determined based only on a service type.

Meanwhile, a size of a segment may be diversely determined according a service type, a size of service data, or a network setting, and when the segment size is larger or smaller than a previous range, a higher transmission rate may be obtained by suitably adjusting the number of multiple connections and a size of a sub-segment.

Let's assume that $N_o$ denotes the optimum number of multiple connections, $S_o$ denotes an optimum size of a sub-segment, and SS denotes a size of a segment to be transmitted. When the size SS of the segment is within a certain range from $N_o \times S_o$, the optimum number $N_o$ of multiple connections and the optimum size $S_o$ of the sub-segment may be used as they are.

However, when the size of the segment to be transmitted is relatively large, the segment is not entirely transmitted if the optimum number $N_o$ of multiple connections and the optimum size $S_o$ of the sub-segment are used. Also, when the size of the segment to be transmitted is relatively small, network resources may be wasted if the optimum number $N_o$ of multiple connections and the optimum size $S_o$ of the sub-segment are used.

Accordingly, the number $N_n$ of multiple connections and a size $S_n$ of a sub-segment, which are adjusted according to each case, may be re-determined as Equation 1.

$$\begin{cases} SS > N_o \times S_o + \beta & \rightarrow S_n = \frac{SS}{N_o}, N_n = N_o \\ N_o \times S_o - \alpha < SS \leq N_o \times S_o + \beta & \rightarrow S_n = S_o, N_n = N_o \\ SS \leq N_o \times S_o - \alpha & \rightarrow S_n = S_o, N_n = \frac{SS}{S_o} \end{cases} \quad \text{(Equation 1)}$$

Here, $\alpha$ and $\beta$ are parameters used to indicate a data range of a certain size based on SS, and are not fixed and may be diversely determined according to embodiments.

FIG. 9 are diagrams for determining a method of determining the number of multiple connections according to a plurality of components included in a web page, according to another embodiment of the present disclosure.

In the embodiment of FIG. 9, when several links are included in a web page layout, the number of multiple connections is determined according to types of services provided by a plurality of servers.

Let's assume that a web page layout of the web browsing application 303 is as shown in FIG. 9A. The web page includes total five links, and in detail, includes two text links Text 1 and Text 4, two image links Image 2 and Image 3, and one video link Video 5.

As shown in FIG. 9B, when a web page is loaded and entire content is serviced through a single connection with respect to each service, a client requests 5 connections corresponding to the number of links in the web page and receives a segment. However, when each of services corresponds to a single connection and the services are provided from different servers, the client is connected to one server via a single connection.

As such, when the client is connected to each of the multiple servers corresponding to the plurality of links via a single connection, a lot of time is consumed to receive content of a video link having large data capacity for a service, and loading of the entire web page is delayed until the content of the video link is processed.

Accordingly, a method of determining the number of multiple connections is determined according to each link, as shown in FIG. 9C.

Since the more number of multiple connections is required when data capacity transmitted from a server among links included in a web page is large, a receiving speed of content corresponding to a video link may be increased by assigning the more number of multiple connections to the video link than other links, and as a result, a processing speed of the entire web page may be increased.

Accordingly, when service content is received from multiple servers respectively corresponding to links included in a web page, the client needs to determine the optimum number of multiple connections to be connected to each of the multiple servers.

FIGS. 10A to 10B are diagrams for describing a method of determining the number of multiple connections by using a multiple connection history when a client accesses multiple servers, according to another embodiment of the present disclosure.

In the embodiment of FIG. 9, the optimum numbers of connections of links other than a video link are all 1, but when a client actually accesses multiple servers, each number of multiple connections may be determined according to a type of a service provided by each link.

In the embodiment of FIGS. 10A to 10B, it is assumed that that one client 100 is connected to two multiple servers, i.e., a first server 501 (otn.com/sec) and a second server 502 (MLB.com/abc), via multiple connections to provide a service in FIG. 10A.

A multiple connection table of FIG. 10B includes optimum multiple connection information for each server. Like the multiple connection table of FIG. 8, the multiple connection table of FIG. 10B includes a service address, such as a domain or IP address for requesting a service, a type of a service, the optimum number $N_o$ of connections, a transmission rate (maximum transmission rate) $T_o$ of the optimum number of connections, and an optimum size $S_o$ of a subsegment, and additionally includes an encoding rate.

The optimum multiple connection information for multiple connections to the server 1 is recorded in a first row of the multiple connection table of FIG. 10B. A type of a service provided by the server 1 is file downloading FD and the optimum number $N_o$ of multiple connections is 10.

The optimum multiple connection information for multiple connections to the server 2 is recorded in a third row of the multiple connection table of FIG. 10B. A type of a service provided by the server 2 is smooth streaming SS and the optimum number $N_o$ of multiple connections is 15.

When the client multi-connects to two servers in order to receive a service from the server 1 and the server 2 and optimum multiple connection information of each of the servers 1 and 2 exists in the multiple connection table as in FIG. 10B, the number of multiple connections is rearranged by referring to the configuration of the optimum number of multiple connections.

For example, when the optimum number of multiple connections usable by the client is 25, 10 may be assigned to the server 1 and 15 may be assigned to the server 2, and when the optimum number of multiple connections usable by the client is 15, 6 may be assigned to the server 1 and 9 may be assigned to the server 2. As such, a ratio of 2:3 may be maintained.

Alternatively, a priority may be assigned based on a service type. Since a streaming (SS or HLS) service requires a higher transmission rate than a file downloading (FD) service, a priority is assigned to the server 2 providing the smooth streaming service over the server 1 providing the file downloading service so as to assign the more number of multiple connections to the server 2.

For example, when the optimum number of multiple connections usable by the client is 15, 12 is assigned to the server 2 and 3 is assigned to the server 1 to receive service content, and after all of service content of the server 2 is received, the remaining number of multiple connections is re-assigned to the server 1. Here, an assigning ratio may be experimentally or statistically determined, and may be periodically updated according to collected data.

Figure 11A:
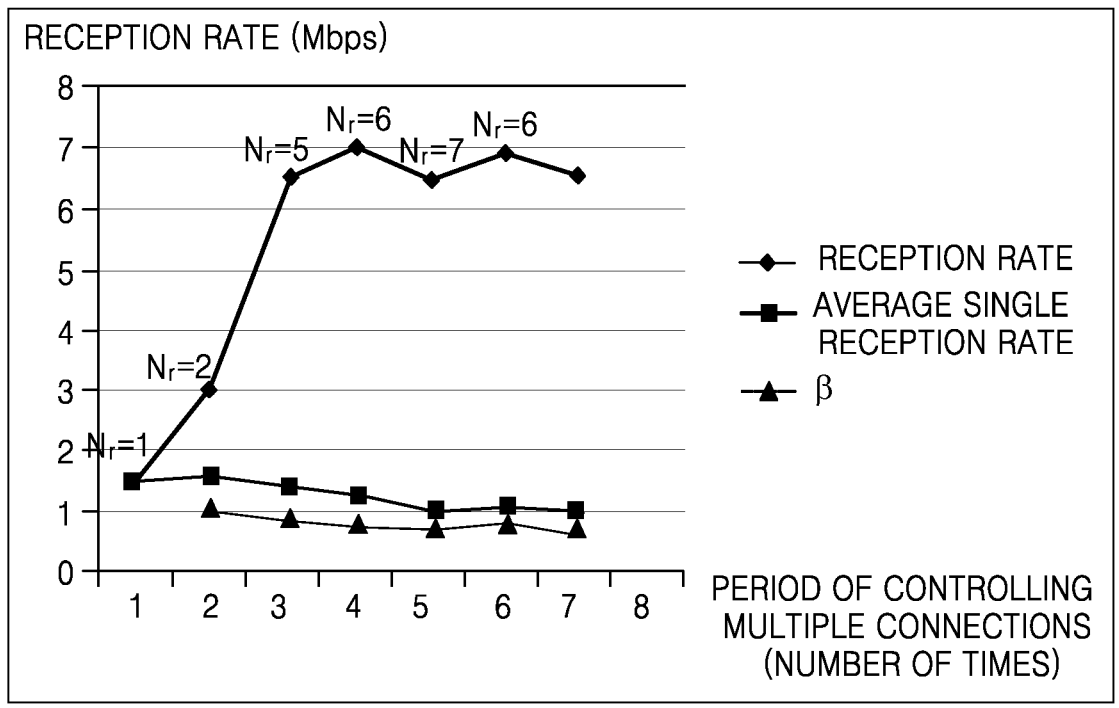
FIG. 11A illustrates a data reception rate of a client according to the number of times multiple connections are controlled, in a method of determining the number of multiple connections by using an average single reception rate, according to another embodiment of the present disclosure.
Figure 11B:
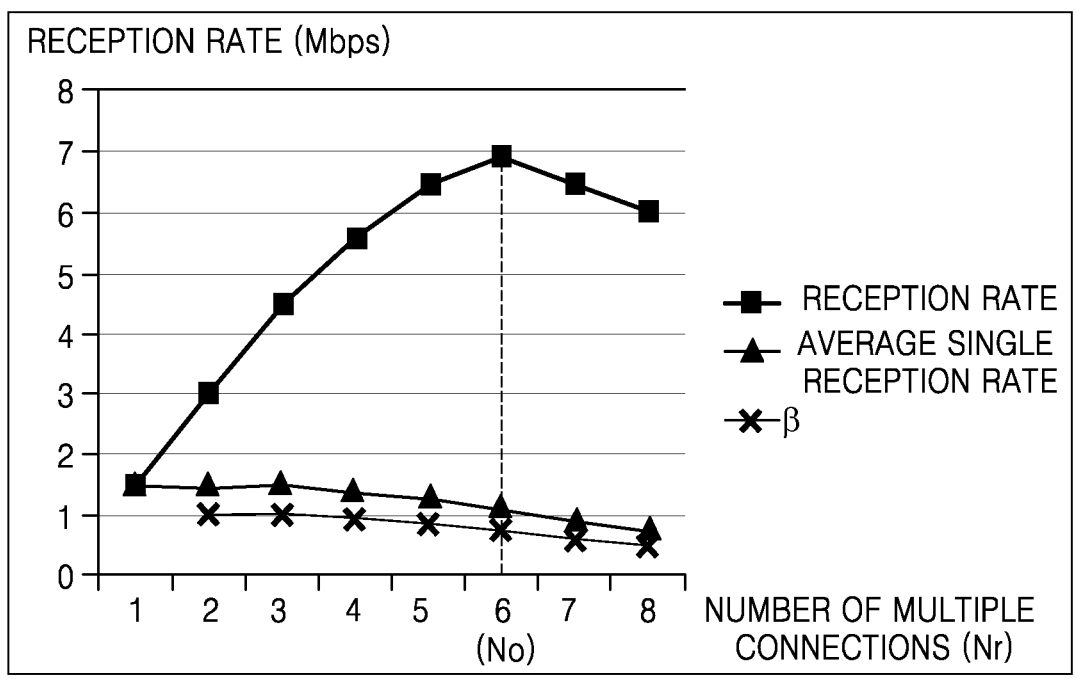
FIG. 11B illustrates a reception rate according to the current number $N_r$ of multiple connections, in a method of determining the number of multiple connections by using an average single reception rate, according to another embodiment of the present disclosure.

FIGS. 11A to 11B are diagrams illustrating a relationship between the number of multiple connections and a transmission rate when the number of multiple connections is determined by using an average single reception rate, according to another embodiment of the present disclosure.

According to another embodiment of the present disclosure, the optimum number of multiple connections may be determined by increasing or decreasing the number of multiple connections based on an average single reception rate of the multiple connections. In the present specification, a reception rate denotes a data amount received per hour of receiving, by a client, data transmitted from a server, and is used in the similar concept as a transmission rate.

An average single reception rate $Tas(N_i)$ is obtained by dividing a reception rate $T(N_i)$ when the number of multiple connections is $N_i$ by $N_i$, i.e., the number of multiple connections, and denotes a reception rate of data received through one connection during $N_i$ multiple connections.

In other words, an average single reception rate Tas (N) is defined as Equation 2.

$$Tas(N) = \frac{T(N)}{N} \qquad \text{(Equation 2)}$$

In order to determine the optimum number $N_o$ of multiple connections based on an average single reception rate, multiple connections are formed as much as the initial number $N_i$ of multiple connections and a reception rate $T(N_i)$ then is obtained. Then, a reception rate $T(N_i+\alpha)$ when the number of multiple connections is $N_i+\alpha$ by increasing the number of multiple connections by a is obtained, and $T(N_i)$ and $T(N_i+\alpha)$ are compared.

Since the optimum number of multiple connections is determined such that a high reception rate is obtained, $T(N_i)$ and $T(N_i+\alpha)$ are compared and when $T(N_i)$ is equal to or greater than $T(N_i+\alpha)$, the optimum number $N_o$ of multiple connections is determined to be $N_i$. However, when $T(N_i)$ is smaller than $T(N_i+\alpha)$ as the result of comparing $T(N_i)$ and $T(N_i+\alpha)$, a higher reception rate may be obtained by increasing the number of multiple connections to be higher than Here, the increased number N of multiple connections is determined by a parameter β with respect to an average single reception rate increasing ratio of each number of multiple connections.

In other words, the optimum number $N_o$ of multiple connections is determined according to Equation 3.

$$\begin{cases} N_o = N_i, & (T(N_i + \alpha) \leq T(N_i)) \\ N_0 = N_i + N, & (T(N_i + \alpha) > T(N_i)) \end{cases} \qquad \text{(Equation 3)}$$

The reception increasing ratio β is defined according to Equation 4.

$$\beta = \frac{Tas(N_i + \alpha)}{Tas(N_i)} \qquad \text{(Equation 4)}$$

When the increase of an average single transmission rate is relatively large when the number of multiple connections is increased, the reception rate increasing ratio β also has a large value, and when the increase of the average single transmission rate is relatively small, the reception rate increasing ratio β has a small value. Accordingly, by using such characteristics, when the reception rate increasing ratio β is large, the number of multiple connections may be greatly increased and when the reception rate increasing ratio β is not large, the number of multiple connections may be increased a little.

For example, when the increase of the reception rate according to the increase of the number of multiple connections is large because utilization of a single connection is low, the reception rate increasing ratio β may have a value close to 1, and when the increase of the reception rate according to the increase of the number of multiple connections is small, the reception rate increasing ratio β may have a value smaller than 1. Accordingly, when β is in the range of $0.9<\beta\leq1$, the number N of multiple connections being increased may be actively increased by 3, when β is in the range of $0.7<\beta\leq0.9$, the number N of multiple connections being increased may be increased by 2, and when β is in the range of β≤0.7, the number N of multiple connections being increased may be passively increased by 1.

Alternatively, based on when the number of multiple connections is $N_i+\alpha$, when β is in the range of 0.9<β≤1, the number N of multiple connections being increased may be increased by α+3, when β is in the range of 0.7<β≤0.9, the number N of multiple connections being increased may be increased by α+2, and when β is in the range of β≤0.7, the number N of multiple connections being increased may be increased by α+1.

Here, each threshold value may be variously set in addition to 0.7 or 0.9, and may be experimentally or experientially determined.

FIG. 11A is a graph indicating a data reception rate of a client according to the determined number of times multiple connections are controlled, wherein an x-axis denotes the number of times the multiple connections are controlled, and the data reception rate of the client is measured while the multiple connections are controlled 6 times after an initial connection.

During the initial connection, $N_i=1$ and α=1. Since $N_i=1$ during the initial connection, a single connection reception rate T(1) of receiving data by the client when a server and the client are connected via a single connection is calculated, a reception rate T(2) during two multiple connections by increasing the number of connections by α is calculated, and the two values are compared.

As shown in FIG. 11A, based on the result of comparing, T(1) is about 1.5 Mbps and T(2) has a larger value of about 3 Mbps, and thus the number of multiple connections is increased according to Equation 3. Here, since the single reception rate increasing ratio β is Tas(2)/(Tas(1)), and Tas(1)=T(1) and Tas(2)=(T(2))/2, the reception rate increasing ratio β has a value close to 1 and the number N of multiple connections being increased is α+3, and thus the number $N_o$ of multiple connections may be determined to be 5.

Then, the same processes are repeated to determine and update the number of multiple connections, and the optimum number $N_o$ of multiple connections having the maximum transmission rate converges to 6.

FIG. 11B illustrates a reception rate according to the current number $N_r$ of multiple connections in the same environment as FIG. 11A, wherein a reception rate is gradually increased as the number of multiple connections increases until the number of multiple connections is 6, and is rather decreased when the number of multiple connections is equal to or greater than 7. Accordingly, the optimum number of multiple connections for obtaining the maximum reception rate is 6, and the results are the same as those of FIG. 11A.

Figure 12A:
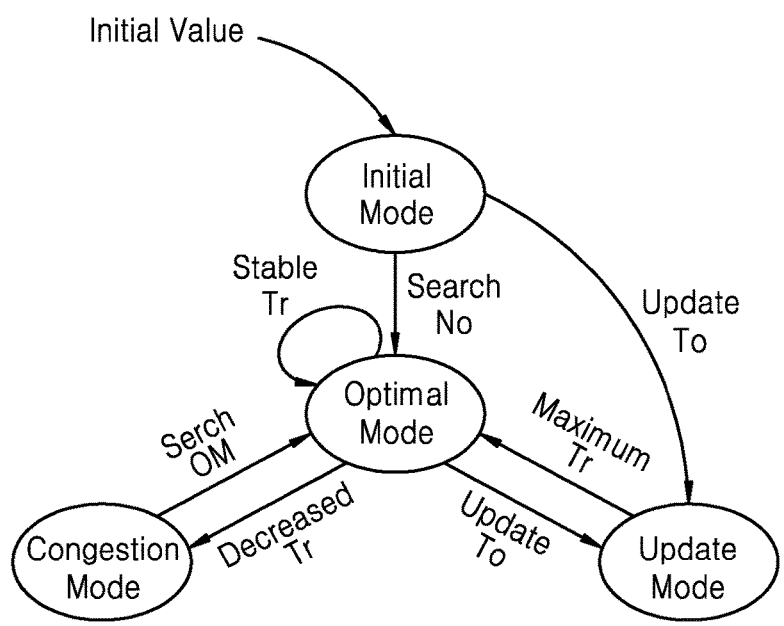
FIG. 12A is a state diagram of multiple connection modes in a method of determining the number of multiple connections by using a state of a multiple connection mode, according to another embodiment of the present disclosure.

FIGS. 12A to 12B illustrate a state diagram of multiple connection modes for determining the number of multiple connections and definitions of each mode, according to another embodiment of the present disclosure.

According to another embodiment of the present disclosure, a state diagram for controlling the optimum number of multiple connections is defined so as to determine and manage the optimum number of connections in real-time, and a determining speed may be managed by using a parameter of controlling an optimum value determining speed.

FIG. 12A is the state diagram of the multiple connection modes for determining the number of multiple connections, according to another embodiment of the present disclosure.

In the embodiment of FIG. 12, four modes, i.e., an initial mode IM, an optimal mode OM, a congestion mode CM, and an update mode UM, are defined. Here, $N_i$ denotes the initial number of connections, $N_o$ denotes the optimum number of connections, $N_n$ denotes the determined number of multiple connections, $N_r$ denotes the current number of multiple connections, $T_o$ denotes the maximum transmission rate, $T_r$ denotes a current transmission rate, and $T_c$ denotes the maximum single connection transmission rate and defined as $T_c=T_o/N_o$.

FIG. 12B illustrates details about a multiple connection mode for determining the number of multiple connections, according to another embodiment of the present disclosure, and is about descriptions about each mode, entering/canceling conditions, and operations in each mode.

First, the initial mode is a mode of forming multiple connections and starting transmission by using an initial value $N_i$, and when the multiple connections are formed according to the set initial value, it is determined whether the transmission rate $T_r$ has a suitable value. Based on the determined $T_r$, the optimal mode may be immediately entered, or may be entered after updating the maximum transmission rate $T_o$ by entering the update mode.

Second, in the optimal mode, it is determined whether a current state is an optimum connection state. In other words, when $T_r(N_o)$, the optimal mode is entered and $T_r(N_o)$ is continuously observed to determine whether to change a mode. When $T_r(N_o)$ has a stable value and is maintained, the optimal mode is continuously maintained, but when the transmission rate is rapidly decreased, the congestion mode is entered, and when a higher transmission rate is obtainable, the update mode is entered to update the maximum transmission rate $T_o$ and then the optimal mode is entered again.

When the optimal mode is entered, whether the number of connections is increased is determined by using $P_{io}$, wherein $P_{io}$ is a parameter for determining a speed of searching for an optimal value for entering the optimal mode from the initial mode, and is defined according to Equation 5.

$$P_{io} = \frac{(N_n - N_i)}{(N_o - N_i)}, (0 < P_{io} \leq 1) \qquad \text{(Equation 5)}$$

Accordingly, the number $N_n$ of multiple connections for entering the optimal mode from the initial mode is determined as Equation 6.

$$N_n = N_i + P_{io} \times (N_o - N_i) \qquad \text{(Equation 6)}$$

Third, the congestion mode is entered when the transmission rate is sharply decreased. In detail, when $T_r < T_o - \alpha \times T_c$, the congestion mode is entered, and at his time, α is a congestion mode control parameter, has a value of α≥1, and determines an entering condition to the congestion mode and a canceling condition from the congestion mode.

In the congestion mode, the number $N_n$ of multiple connections is determined by using $P_{co}$, and when condition of $T_r > T_o - \alpha \times T_c$ is satisfied, the congestion mode is escaped and the optimal mode is entered. Here, $P_{co}$ is a parameter for determining a speed for searching for an optimum value for entering the optimal mode from the congestion mode, and is defined according to Equation 7.

$$P_{co} = \frac{(N_n - N_r)}{(N_o - N_r)}, (0 < P_{co} \leq 1) \qquad \text{(Equation 7)}$$

Accordingly, the number $N_n$ of multiple connections for entering the optimal mode from the congestion mode is determined according to Equation 8.

$$N_n = N_i + P_{co} \times (N_o - N_r) \quad \text{(Equation 8)}$$

Fourth, the update mode is entered to change the maximum transmission rate when a network situation is good and a high transmission rate is obtainable. In detail, when a condition of $T_r > T_o + \beta \times T_c$ is satisfied, the update mode is entered to set $T_r$ as a new maximum transmission rate $T_o$ and a new $N_o$ is determined therefrom. When $T_r$ is updated, the update mode is immediately canceled and the optimal mode is entered.

Here, $\beta$ is an update mode control parameter, has a value of $\beta \geq 1$, and determines an entering condition to the update mode and a canceling condition from the update mode.

Figure 13:
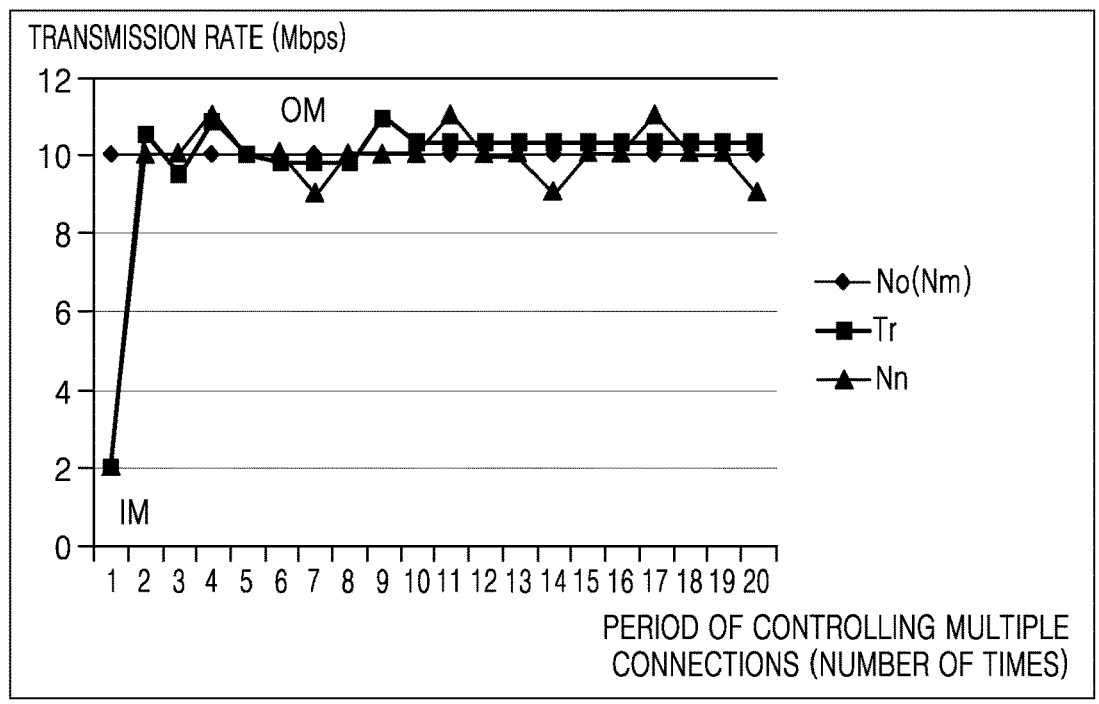
FIG. 13 is a diagram illustrating a relationship between a transmission rate and a relationship between the number of multiple connections according to the number of times multiple connections are controlled, when the number of multiple connections is determined according to a multiple connection mode, according to another embodiment of the present disclosure.

FIG. 13 is a diagram illustrating a relationship between a transmission rate and a relationship between the number of multiple connections according to the number of times multiple connections are controlled, when the number of multiple connections is determined according to a multiple connection mode, according to another embodiment of the present disclosure.

FIG. 13 illustrates a relationship between the current number $N_n$ of multiple connections and the optimum number $N_o$ of multiple connections according to the number of times the multiple connections is controlled, wherein an y-axis denotes the number of multiple connections, and $T_r$ denotes a transmission rate. The relationship is displayed on one drawing to show an overall aspect of change, but units thereof do not match.

In the embodiment of FIG. 13, the initial number $N_i$ of connections is 2 and $P_{io}$ is 1, and in an initial mode, it is determined whether to change a mode based on a transmission rate $T_r(2)$ after setting two multiple connections during initial connection. Since $P_{io}=1$, $N_n=N_o$ according to Equation 6, and thus $N_n=10$ is determined during an immediately following control time and an optimal mode is entered from the initial mode.

In FIG. 13, $N_n$ is periodically changed to determine whether $T_r$ is changed and determine whether the optimum number $N_o$ of multiple connections needs to be increased.

The optimum number $N_o$ of multiple connections is continuously maintained to be 10, and a network environment may be inferred to be stable. Also, during an early stage of starting transmission and entering the optimal mode from the initial mode, $T_r$ slightly fluctuates but after controlling the multiple connections about 10 times, $T_r$ is stable.

Figure 14:
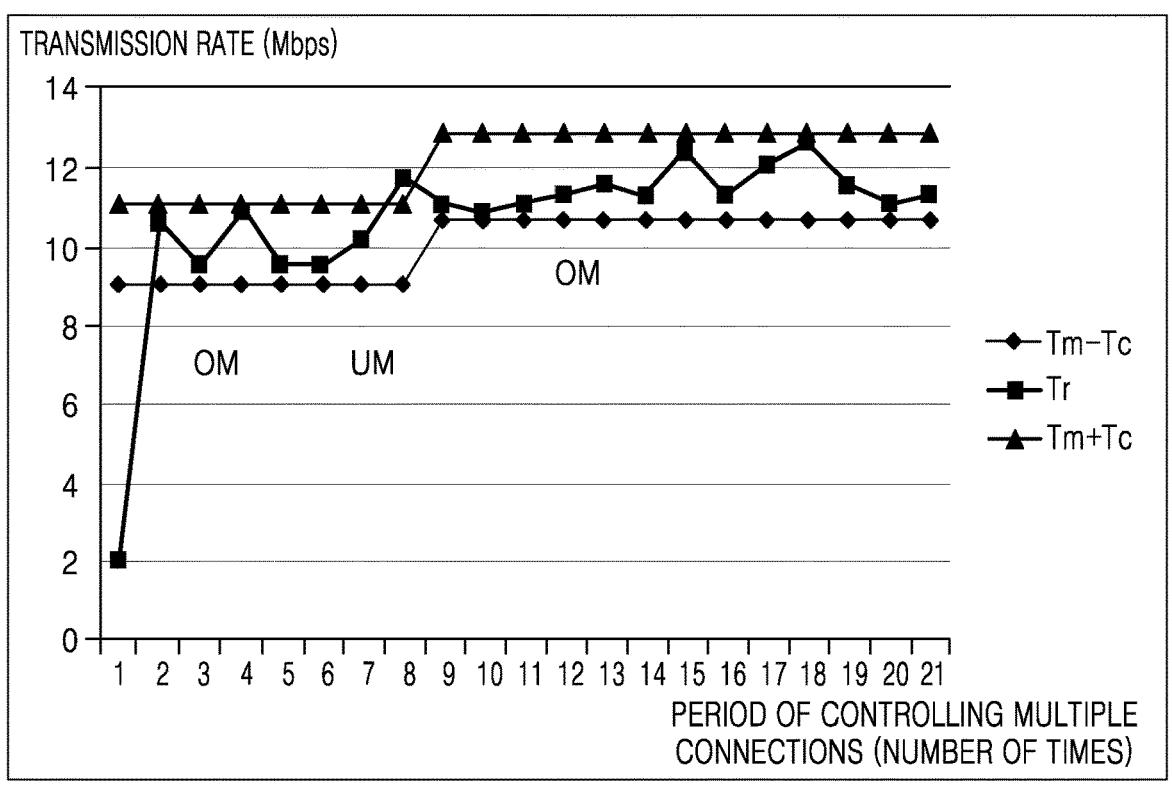
FIG. 14 is a diagram illustrating a relationship between the number of times multiple connections are controlled and a transmission rate, when the number of multiple connections is determined according to a multiple connection mode, according to another embodiment of the present disclosure.

FIG. 14 is a diagram illustrating a relationship between the number of times multiple connections are controlled and a transmission rate, when the number of multiple connections is determined according to a multiple connection mode, according to another embodiment of the present disclosure.

In the embodiment of FIG. 14, the initial number $N_i$ of connections is 2 and $P_{io}$ is 1 like FIG. 13, and a congestion mode control parameter $\alpha$ and an update mode control parameter $\beta$ are both 1.

Since the congestion mode control parameter $\alpha$ and the update mode control parameter $\beta$ are also 1, if the current transmission rate $T_r$ is within the range of $T_o - T_c \leq T_r \leq T_o + T_c$, the optimal mode is maintained, However, when $T_r < T_o - T_c$, the transmission rate is sharply decreased, and thus the congestion mode is entered to decrease the number of multiple connections. Also, when $T_r > T_o + T_c$, the transmission rate is high, and thus the update mode is entered to newly update and determine the optimum number $N_o$ of multiple connections and the maximum transmission rate $T_o$.

Referring to FIG. 14, since the initial number $N_i$ of connections is 2, in the initial mode, two multiple connections are set during an initial connection, and then it is determined whether to change a mode based on the transmission rate $T_r(2)$. Since $P_{io}=1$, $N_n=N_o$ according to Equation 6, and thus $N_n=10$ is determined during an immediately following control time and an optimal mode is entered from the initial mode.

Since a certain level of $T_r$ is maintained until the number of times multiple connections are controlled reaches 7, the optimal mode is maintained without entering the congestion mode or the update mode. However, when the number of times multiple connections are controlled reaches 8, $T_r$ becomes larger than $T_o + T_c$, and thus the update mode is entered to update the optimum number $N_o$ of multiple connections and the maximum transmission rate $T_o$.

After updating the optimum number $N_o$ of multiple connections and the maximum transmission rate $T_o$ by entering the update mode, the update mode is immediately canceled and the optimal mode is entered, and at this time, the maximum transmission rate $T_o$ for determining the optimal mode becomes $T_r$, i.e., the updated result. In FIG. 14, it is checked that the updated maximum transmission rate $T_o$ is applied after the multiple connections are controlled 9 times, and thus has a higher transmission rate range than the optimal mode range until the multiple connections are controlled 8 times.

Figure 15:
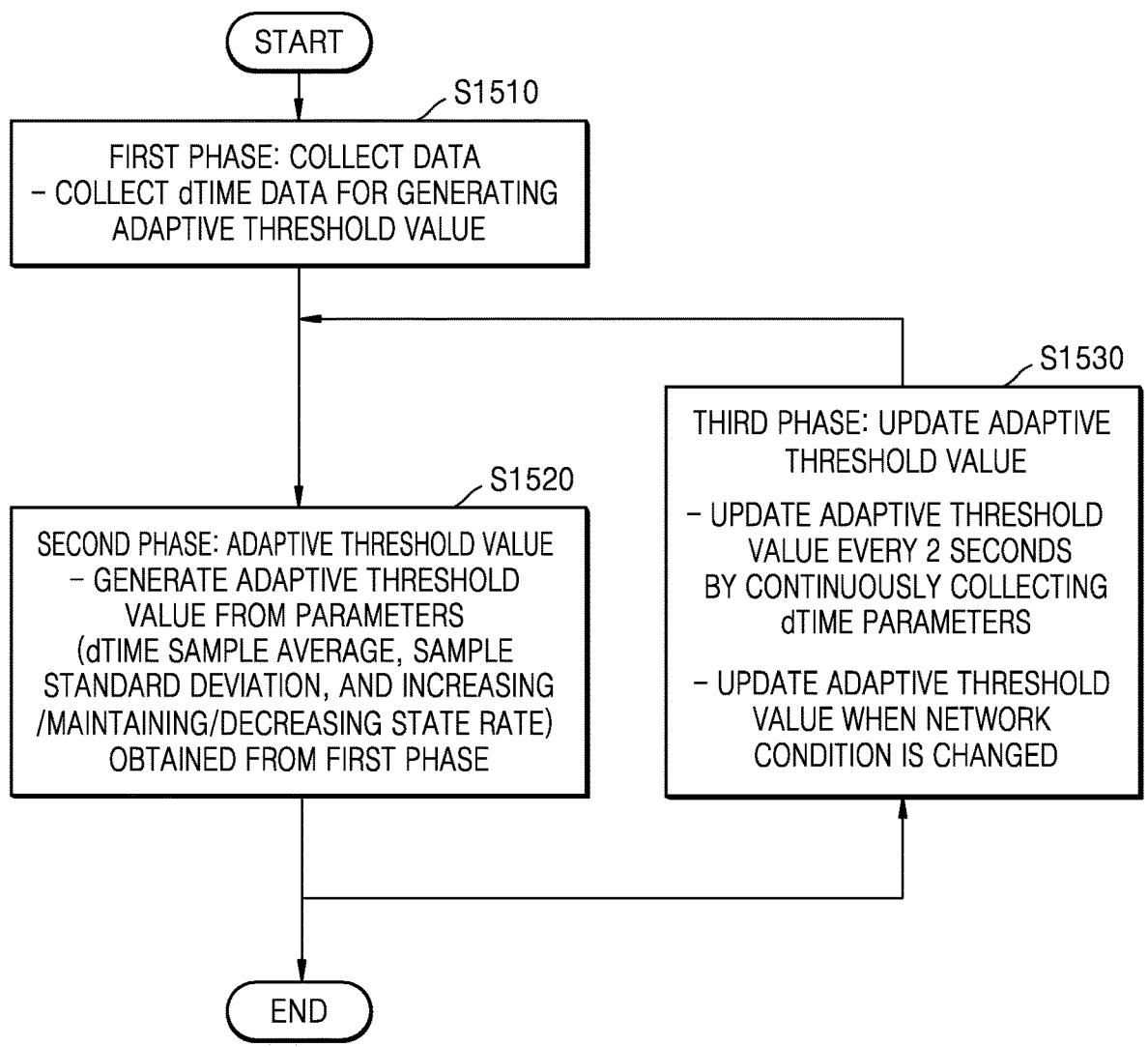
FIG. 15 is a flowchart of a method of determining the number of multiple connections based on a packet arrival time difference, according to an embodiment of the present disclosure.

FIG. 15 is a flowchart of a method of determining the number of multiple connections based on a packet arrival time difference, according to another embodiment of the present disclosure.

The method of determining the number of multiple connections based on the packet arrival time difference uses an arrival time difference of each packet by using a time stamp of a packet received by a client. When a network environment is good, an affect of fading or interference to a transmission signal is low, and thus a time delay is low between data transmitted from a server and received by the client.

Accordingly, an indicator of determining a network state may be derived by using a transmitting and receiving time difference of data. Also, by using an arrival time difference of a received packet, not only a network state may be analyzed in small resolution, but also a network state indicator may be derived in real-time and the number of multiple connections may be adaptively controlled.

New variables are defined to calculate the network state indicator based on the packet arrival time difference. $dPAT_i$ denotes an arrival time difference (delta packet arrival time) of a packet received i+1th by the client and a packet received $i^{th}$ by the client, and may be represented by Equation 9.

$$dPAT_i = PAT_{i+1} - PAT_i \quad \text{(Equation 9)}$$

dTime (low passed delta packet arrival time) is a result of performing smoothing filtering on $dPAT_i$ samples so as to remove a data sample having low reliability, such as a data sample in which a packet arrival delay is generated due to a particular circumstance, and is defined as Equation 10.

$$dTime = f_{LOW}(dPAT_1, \ldots, dPAT_i, \ldots, dPAT_N) \quad \text{(Equation 10)}$$

A threshold value of dTime, i.e., a criteria for increasing or decreasing the number of multiple connections based on a statistical feature of dTime, is determined, and the determined threshold value of dTime is used to control the number of multiple connections.

A detailed method of determining the number of multiple connections based on the packet arrival time difference is performed according to the flowchart of FIG. 15, and includes three phases.

A first phase (operation S1510) is a data collecting phase, and is a phase of collecting dTime data for generating an adaptive threshold value. In the first phase, the number of multiple connections may be determined by using an optimum fixed threshold value through probability distribution modeling, or may be determined by using predetermined increasing, maintaining, decreasing, and ending conditions of the number of multiple connections.

A second phase (operation S1520) is a phase of determining and applying an adaptive threshold value, and generates adaptive threshold values, i.e., THR_I_R and THR_R_D, which are threshold dTime changing the number of multiple connections, by using a sample average, a sample standard deviation, and an increasing/maintaining/decreasing state rate of the number of multiple connections calculated from the dTime obtained in the first phase (operation S1510).

When the measured dTime is between THR_I_R and THR_R_D, the current number of multiple connections is maintained, and when a measured packet arrival time difference is smaller than THR_I_R, it may be estimated that a network state is good, and thus the number of multiple connections is increased. On the other hand, when the measured packet arrival time difference is greater than THR_R_D, it may be estimated that the network state is not good, and thus the number of multiple connections is decreased.

A third phase (operation S1530) is a phase of updating the adaptive threshold value, and updates the adaptive threshold value from dTime obtained in the second phase (operation S1520) on regular cycles or when a network condition is changed.

Figure 16:
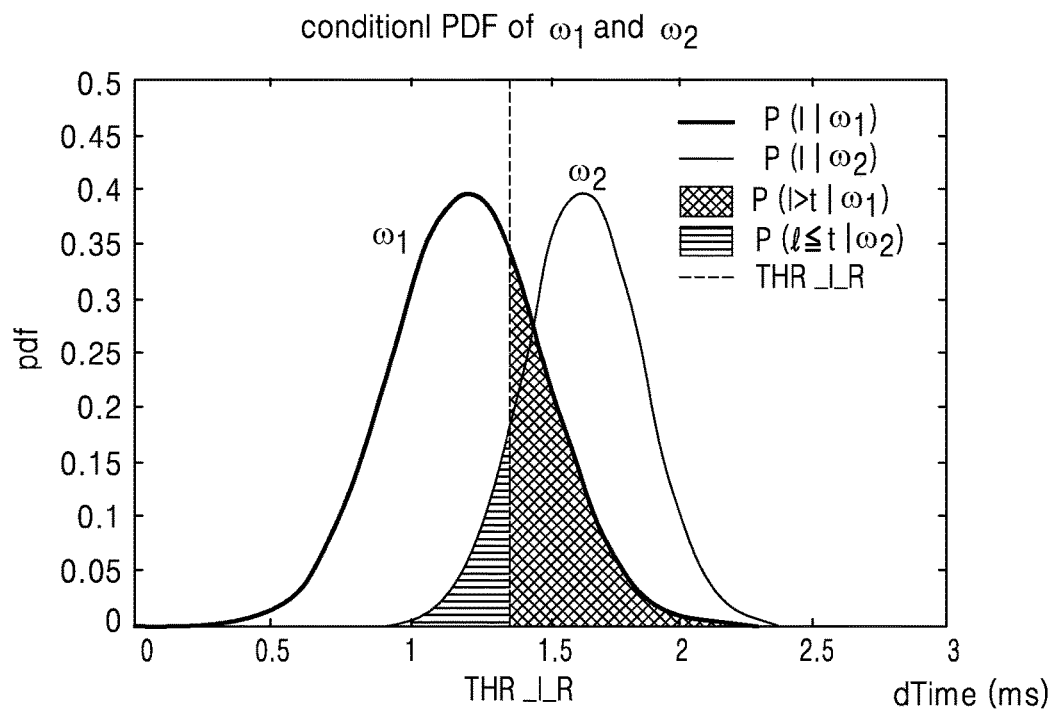
FIG. 16 is a diagram illustrating probability distribution modeling results for determining an optimum threshold value in a method of determining the number of multiple connections based on a packet arrival time difference, according to an embodiment of the present disclosure.

FIG. 16 is a diagram illustrating probability distribution modeling results for determining an optimum threshold value in a method of determining the number of multiple connections based on a packet arrival time difference, according to an embodiment of the present disclosure.

In order to describe detailed operations, $(x|\omega_1)$, $(x|\omega_2)$, and $(x|\omega_3)$ are defined. $(x|\omega_1)$ denotes dTime samples collected when the number of multiple connections needs to be higher than the current number of multiple connections so as to obtain an optimum transmission rate, $(x|\omega_2)$ denotes dTime samples collected when the current number of multiple connections needs to be maintained so as to obtain the optimum transmission rate, and $(x|\omega_3)$ denotes dTime samples collected when the current number of multiple connections needs to be decreased so as to obtain the optimum transmission rate.

In other words, when a value of the collected dTime sample is smaller than THR_I_R, the dTime sample is collected when the number of multiple connections needs to be increased, and thus the dTime sample is $(x|\omega_1)$, when the value of the collected dTime sample is greater than THR_R_D, the dTime sample is collected when the number of multiple connections needs to be decreased, and thus the dTime sample is $(x|\omega_3)$, and when the value of the collected dTime sample is between THR_I_R and THR_R_D, the dTime sample is collected when the current number of multiple connections needs to be maintained, and thus the dTime sample is $(x|\omega_2)$.

When it is assumed that a measured value of dTime is a random variable x and the x is in accordance with a log-normal distribution, ln(x) is in accordance with a normal distribution, i.e., a Gaussian distribution.

When probability density functions of $\ln(x|\omega_1)$ and $\ln(x|\omega_2)$ are respectively $p(l|\omega_1)$ and $p(l|\omega_2)$, a packet arrival time difference in a situation when the number of multiple connections needs to be increased is smaller than that in a situation when the number of multiple connections needs to be maintained, and thus $p(l|\omega_1)$ has a peak at the smaller dTime than $p(l|\omega_2)$.

In an illustrated probability density function $p(l|\omega_3)$ of $\ln(x|\omega_3)$ is also illustrated, $p(l|\omega_3)$ has a peak at a dTime later than $p(l|\omega_2)$ and thus may be shown in a Gaussian distribution more to the right than $p(l|\omega_2)$.

In FIG. 16, a probability $p(l>THR\_I\_R|\omega_1)$, wherein $(x|\omega_1)>THR\_I\_R$, based on when dTime is THR_I_R is obtained by integrating $p(l|\omega_1)$ with respect to the range of x>THR_I_R, and is equal to an area S1 displayed in lattice in FIG. 16. An S1 region denotes a proportion of a state where the number of multiple connections is increased despite the number of multiple connections has to be maintained because the measured dTime is greater than THR_I_R.

Also, in FIG. 16, a probability $p(l \leq THR\_I\_R|\omega_2)$, wherein $(x|\omega_2) \leq THR\_I\_R$, based on when dTime is THR_I_R is obtained by integrating $p(l|\omega_2)$ with respect to the range of x≤THR_I_R, and is equal to an area S2 displayed in horizontal lines in FIG. 16. An S2 region denotes a proportion of a state where the number of multiple connections is maintained despite the number of multiple connections has to be increased because the measured dTime is smaller than THR_I_R.

As a result, S1 and S2 denote proportions of a state of malfunction, and thus a malfunction rate or an error rate may be minimized by determining dTime that minimizes S1 and S2 as the threshold value THR_I_R.

The error rate may be minimized by determining THR_R_D in the same manner.

Figure 17:
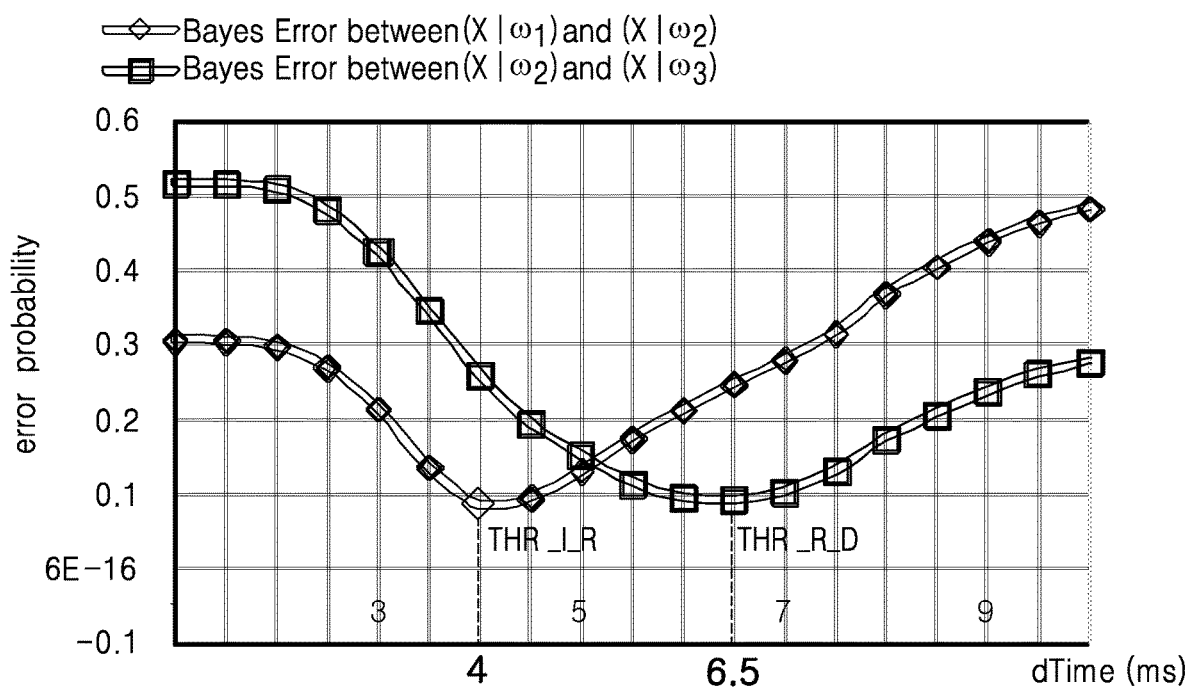
FIG. 17 is a diagram illustrating a relationship between dTime and a Bayes error in a method of determining the number of multiple connections based on a packet arrival time difference, according to an embodiment of the present disclosure.

FIG. 17 is a diagram illustrating a relationship between dTime and a Bayes error in a method of determining the number of multiple connections based on a packet arrival time difference, according to an embodiment of the present disclosure.

Bayes errors of $p(l|\omega_1)$ and $p(l|\omega_2)$ each having a Gaussian distribution have forms shown in FIG. 17. A value oft where the Bayes errors of $p(l|\omega_1)$ and $p(l|\omega_2)$ are minimum is determined to be THR_I_R, i.e., a threshold value of dTime, for determining whether to increase the number of multiple connections, and is deductively induced from a Bayes error formula.

Bayes errors of $p(l|\omega_2)$ and $p(l|\omega_3)$ each having a Gaussian distribution have the same forms, and a value oft where the Bayes errors of $p(l|\omega_2)$ and $p(l|\omega_3)$ are minimum is determined to be THR_R_D, i.e., a threshold value of dTime, for determining whether to decrease the number of multiple connections.

After THR_I_R and THR_R_D are both determined, current dTime is measured and the number of multiple connections may be controlled by increasing the number of multiple connections when dTime<THR_I_R, decreasing the number of multiple connections when dTime>THR_R_D, and maintain the number of multiple connections when THR_R_D≤dTime≤THR_I_R.

In FIG. 17, since the Bayes errors of $p(l|\omega_1)$ and $p(l|\omega_2)$ have minimum values when dTime is 4 ms, THR_I_R is determined to be 4 ms. Also, since the Bayes errors of p(1|ω$_2$) and p(1|ω$_3$) have minimum values when dTime is 6.5 ms, THR_R_D may be determined to be 6.5 ms.

Accordingly, the current dTime is measured and when dTime<4 ms, the number of multiple connections is increased, when dTime>6.5 ms, the number of multiple connections is decreased, and when 4 ms≤dTime≤6.5 ms, the number of multiple connections may be determined to be maintained.

Hereinafter, a detailed method of determining an adaptive threshold value by using a Bayes error is described.

Since the random variable x with respect to dTime is assumed to be the log-normal distribution, a new random variable $Z_i$ is defined as Equation 11 to convert the random variable x to Gaussian distribution.

$$Z_i = \frac{\ln(x) - \alpha_i}{\beta_i} \quad \text{(Equation 11)}$$

Here, $\alpha_i$ denotes an average of a natural log value $\ln(x|\omega_i)$ of a dTime sample $(x|\omega_i)$ collected in each state, and $\beta_i$ denotes a standard deviation of $\ln(x|\omega_i)$, wherein $\alpha_i$ and $\beta_i$ are respectively defined as Equations 12 and 13.

$$\alpha_i = \frac{1}{N_i}\sum_{j=1}^{N_i} \ln(x_j) \quad \text{(Equation 12)}$$

$$\beta_i = \sqrt{\frac{1}{N_i-1}\sum_{j=1}^{N_i}(\ln(x_j)-\alpha_i)^2}, \ (x_i \in \omega_i) \quad \text{(Equation 13)}$$

The adaptive threshold value THR_I_R is deductively induced from the Bayes error formula to be determined according to Equation 14.

$$\text{THR\_I\_R} = e^{l_1} \quad \text{(Equation 14)}$$

Here, $l_1 = \frac{-b_1 \pm \sqrt{b_1^2 - 4a_1c_1}}{2a_1}(\beta_1 \neq \beta_2)$, $a_1 = \frac{1}{\beta_2^2} - \frac{1}{\beta_1^2}$, $b_1 = -2\left(\frac{\alpha_2}{\beta_2^2} - \frac{\alpha_1}{\beta_1^2}\right)$, and $c_1 = \frac{\alpha_2^2}{\beta_2^2} - \frac{\alpha_1^2}{\beta_1^2} + \ln\left(\frac{K\beta_2}{L\beta_1}\right)^2$.

In the same method, the adaptive threshold value THR_R_D is deductively induced from the Bayes error formula to be determined according to Equation 15.

$$\text{THR\_R\_D} = e^{l_2} \quad \text{(Equation 15)}$$

Here, $l_2 = \frac{-b_2 \pm \sqrt{b_2^2 - 4a_2c_2}}{2a_2}(\beta_2 \neq \beta_3)$, $a_2 = \frac{1}{\beta_3^2} - \frac{1}{\beta_2^2}$, $b_2 = -2\left(\frac{\alpha_3}{\beta_3^2} - \frac{\alpha_2}{\beta_2^2}\right)$, and $c_2 = \frac{\alpha_3^2}{\beta_3^2} - \frac{\alpha_2^2}{\beta_2^2} + \ln\left(\frac{K\beta_3}{L\beta_2}\right)^2$.

As described above, in the method of determining the number of multiple connections based on the packet arrival time difference, according to an embodiment of the present disclosure, the first phase is the phase of collecting dTime data for generating the adaptive threshold value, and thus the adaptive threshold value is not yet determined. Accordingly, in the first phase, the number of multiple connections may be determined based on the optimum fixed threshold value using the probability distribution modeling, or may be determined by using the predetermined increasing, maintaining, decreasing, and ending conditions of the number of multiple connections.

The method of determining the number of multiple connections based on the optimum fixed threshold value using the probability distribution modeling uses the probability density function of the dTime sample collected in each state.

In the first phase, when a server and a client are connected, the number of multiple connections is increased from an initial value $N_i$ to a final value $N_f$, a transmission rate of each of the number of multiple connections is measured, and dTime samples are collected.

When the number of multiple connections for obtaining the maximum transmission rate is $N_o$ based on the results of measuring the transmission rate according to the number of multiple connections, dTime samples collected when the numbers of multiple connections are 1 to $N_o-1$, which are smaller than the number $N_o$ of multiple connections, are $(x|\omega_1)$, and dTime samples collected in the optimum number $N_o$ of multiple connections are $(x|\omega_2)$. Also, dTime samples collected when the numbers of multiple connections are $N_o+1$ to $N_f$, which are greater than the optimum number $N_o$ of multiple connections, are $(x|\omega_3)$.

Here, conditions for determining $\omega_1$, $\omega_2$, and $\omega_3$ may be defined as the number of multiple connections in a certain range from the optimum number $N_o$ of multiple connections. For example, when the number of multiple connections for obtaining the maximum transmission rate is 4, the range of number of multiple connections of ±1 based on 4 may be defined as a state for maintaining the number of multiple connections.

In this case, dTime samples collected when the numbers of multiple connections are 1 and 2 are $(x|\omega_1)$, dTime samples collected when the numbers of multiple connections are 3, 4, and 5 are $(x|\omega_2)$, and dTime samples collected when the numbers of multiple connections are equal to and greater than 6 are $(x|\omega_3)$.

Values induced from the collected dTime samples may be applied to Equations 11 through 15 to determine the fixed threshold value to be applied in the first phase.

Alternatively, the number of multiple connections may be determined by using the predetermined increasing, maintaining, decreasing, and ending conditions of the number of multiple connections in the first phase.

Until the sufficient amount of dTime samples is collected, the increasing/maintaining/decreasing/ending conditions fixed according to the number of multiple connections are applied.

For example, in the first phase, when the server and the client are connected, the multiple connections are increased to collect the dTime samples for generating the adaptive threshold value, wherein the number of multiple connections is increased when the number of multiple connections is 1 to 4, the number of multiple connections is maintained when the number of multiple connections is 5 to 7, and the number of multiple connections is decreased when the number of multiple connections is equal to or greater than 8.

Alternatively, when the number of multiple connections is equal to or greater than 12 or when 2 seconds are passed after an initial connection, the first phase is ended and the second phase is entered to determine the adaptive threshold value by using the collected dTime samples. When such a method is applied to the first phase, processes of analyzing a collected sample and calculating a threshold value are not required.

Figure 18:
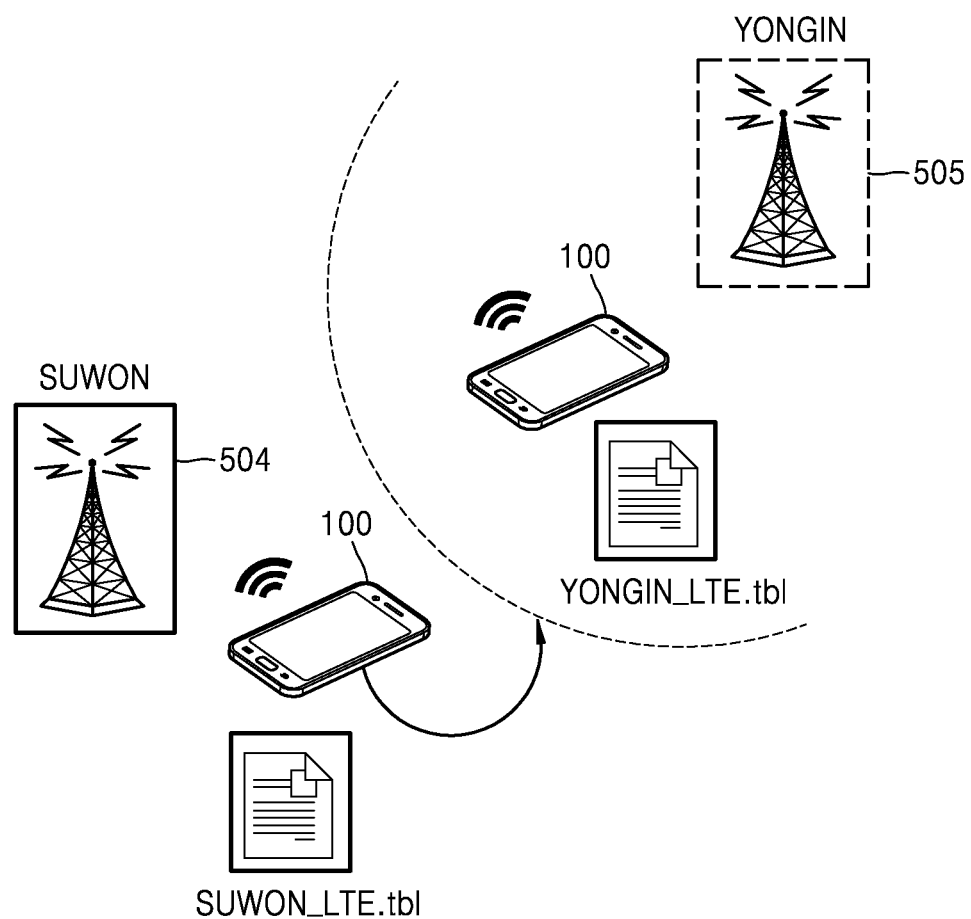
FIG. 18 is a diagram for describing operations when a client has mobility, according to an embodiment of the present disclosure.

FIG. 18 is a diagram for describing operations when a client has mobility, according to an embodiment of the present disclosure.

Hereinabove, the method of determining the number of multiple connections based on the client has been described. According to the client-based multiple connection number determining method, the client determines the number of multiple connections and the size of sub-segment according to a network situation or a service type, and stores and manages the multiple connection table in which such multiple connection history information is stored.

As described above, the client 100 denotes an apparatus capable of executing an application, such as a mobile phone, a smart phone, a PDA, a PDA phone, a laptop computer, or a smart TV, and may include any type of apparatuses connected to the server through the network. A representative client may be a smart phone, and since the smart phone is usually always carried by a user, the smart phone has high mobility whose location is continuously changed according to movement of the user, and is always connected to a base station.

When the client has mobility, a network environment continuously changes according to a moving region, and when the client is a mobile phone, a currently located region may be determined based on information received from a base station. Accordingly, in order to suitably control multiple connections according to regions, the client prepares and stores a multiple connection control table of the currently located region, and controls the multiple connections by using the multiple connection control table.

In FIG. 18, the client 100 prepares a multiple connection control table SUWON_LTE.tbl of Suwon based on information received from a base station 504 of Suwon, when the client 100 enters Suwon. After preparing SUWON_LTE.tbl, the client 100 may determine the number of multiple connections and a size of sub-segment by using SUWON_LTE.tbl.

Then, when the client 100 enters Yongin near Suwon, the client has to repeat the same processes of newly preparing and using a multiple connection control table YONGIN_LTE.tbl of Yongin based on information received from a base station 505 of Yongin.

As a result, when a network environment is new by moving to a new region, the client has to prepare a new multiple control table suitable to the changed network environment every time, and an initial time for adapting to the changed network environment is required.

Figure 19:
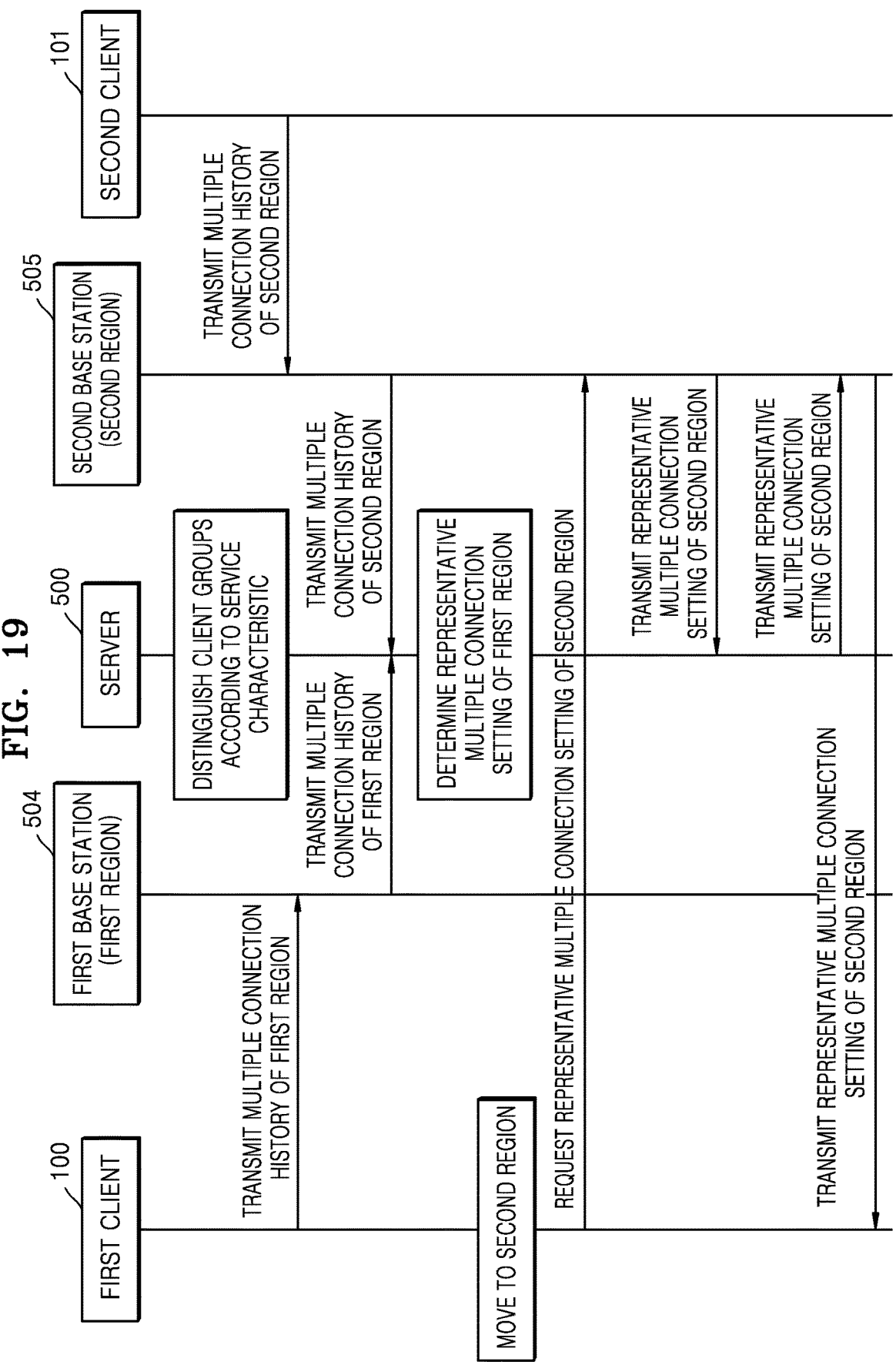
FIG. 19 is a diagram illustrating a system for controlling multiple connections when a client has mobility, according to another embodiment of the present disclosure.

FIG. 19 is a diagram illustrating a system for controlling multiple connections when a client has mobility, according to another embodiment of the present disclosure.

According to another embodiment of the present disclosure, when a client has mobility, the system for using a multiple connection history includes the server 500 managing each base station, base stations (first base station and second base station) of each region, and clients (first client and second client) having mobility. The clients having mobility may exist in different regions, and it is assumed that the first client 100 exists in a first region and the second client 101 exists in a second region.

The server 500 managing the base stations distinguishes clients 100, 101, 102, and 103 in a client group using a multiple connection control history. Here, a distinguishing criterion is determined according to a service characteristic, such as service content, a service channel, or a service method.

The clients (first and second clients) transmit a multiple connection history respectively to the base stations (first and second base stations) of their regions, and the base stations (first and second base stations) transmit the received multiple connection history to the server 500. Here, the multiple connection history transmitted from the client to the base station or from the base station to the server may be a multiple connection table in which the multiple connection history of the client is stored.

The server 500 receives the multiple connection history of each of the clients from the base stations (first and second base stations), and calculates and stores a representative multiple connection setting per each distinguished client group.

Then, according to the mobility of client, the first client may move to the second region. The first client 100 may determine that it is in the second region according to a signal received from the second base station 505. Accordingly, the first client 100 requests the second base station 505 to transmit a representative multiple connection setting of the second region.

Upon receiving the request to transmit the representative multiple connection setting of the second region from the first client 100, the second base station 505 again requests the server 500 to transmit the representative multiple connection setting of the second region. In response to the transmission request, the server 500 transmits the representative multiple connection setting of the second region to the second base station 505, and the second base station 505 again transmits the received representative multiple connection setting of the second region to the first client 100.

When the multiple connection control setting received from the server as such is used, a multiple connection control history according to change of a service characteristic is not required to be directly prepared, and thus deterioration of system performance may be decreased at the beginning of the change of service characteristic.

Here, the multiple connection history and the representative multiple connection setting may also be prepared and shared in a form of table, and the multiple control table may be more efficiently shared when the client and the server shares a common service characteristic-based naming rule.

In FIG. 19, the separate server 500 exists, and the multiple connection control history and the representative multiple connection setting are managed through the server. However, since the base station may also perform functions of the server, the base station may manage the multiple connection control history and the representative multiple connection setting using the clients existing within a radius of the base station even when a separate server does not exist.

Figure 20:
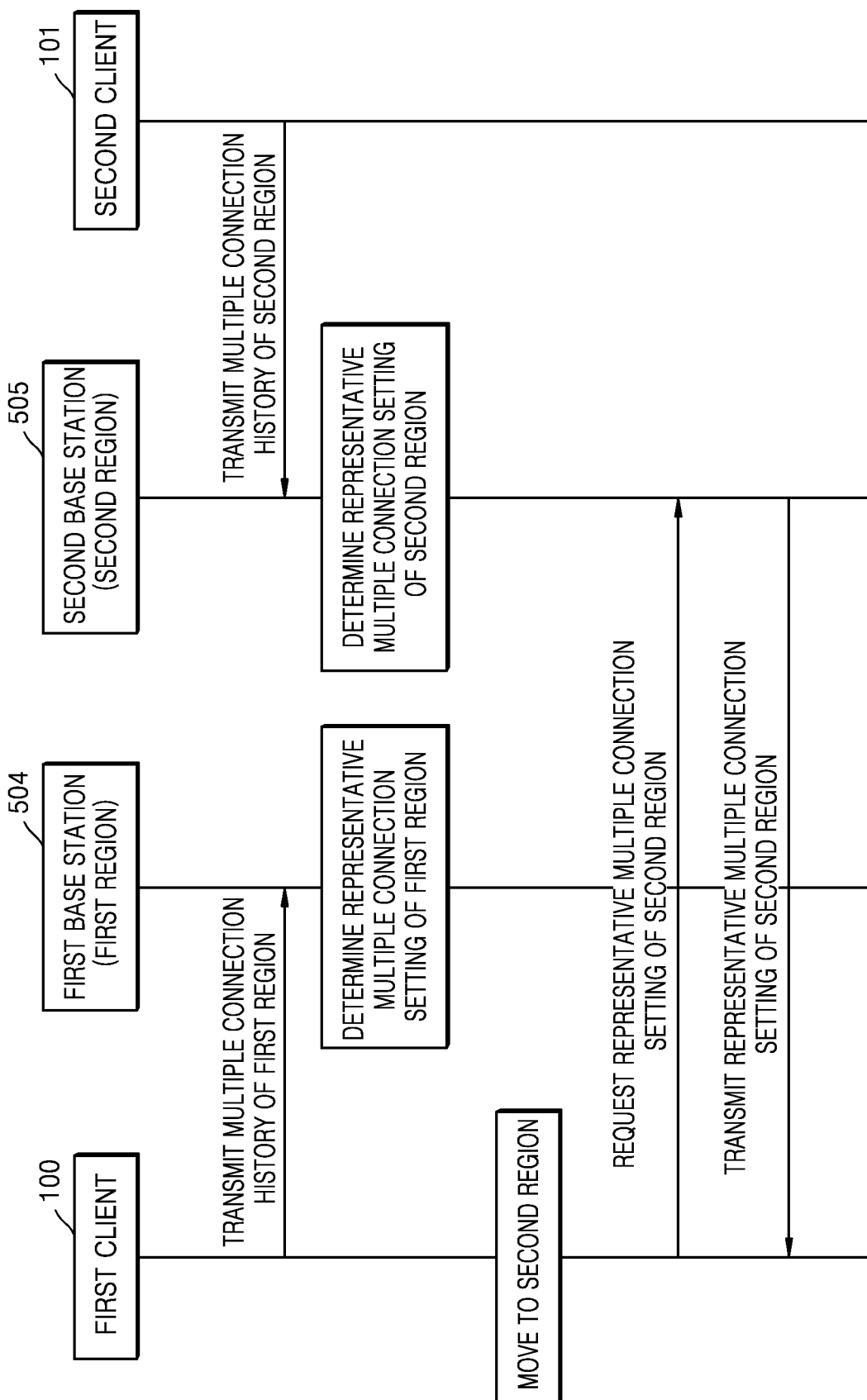
FIG. 20 is a diagram illustrating operations of a system for controlling multiple connections when a client has mobility, according to another embodiment of the present disclosure.

FIG. 20 is a diagram illustrating operations of a system for controlling multiple connections when a client has mobility, according to another embodiment of the present disclosure.

Unlike the system of FIG. 19, the system of FIG. 20 does not include a server managing base stations. However, since each base station may perform operations of a server, each base station may group clients existing in each base station and manage a multiple connection control history received from the client group.

The first base station 504 receives a multiple connection control history from clients including the first client and existing in the first base station and aggregates the received multiple connection control table to determine the representative multiple connection setting of the first region.

The second base station 505 receives a multiple connection history from clients existing in the second base station and aggregates the received multiple connection history to determine the representative multiple connection setting of the second region.

Then, according to mobility of client, the first client may move to the second region. The first client 100 determines that it is in the second region according to a signal received from the second base station 505. Accordingly, the first client 100 requests the second base station 505 to transmit the representative multiple connection setting of the second region.

Upon receiving the request to transmit the representative multiple connection setting of the second region from the first client 100, the second base station 505 again transmits the representative multiple connection setting of the second region stored in the second base station 505 to the first client 100 in response to the transmission request.

As such, when the base station operates as a server, the base station is unable to collectively manage the multiple connection control histories of all regions, but is able to manage the multiple connection control history of the corresponding region, and may more efficiently operate the multiple connection control history since a separate server is not used.

Figure 21:
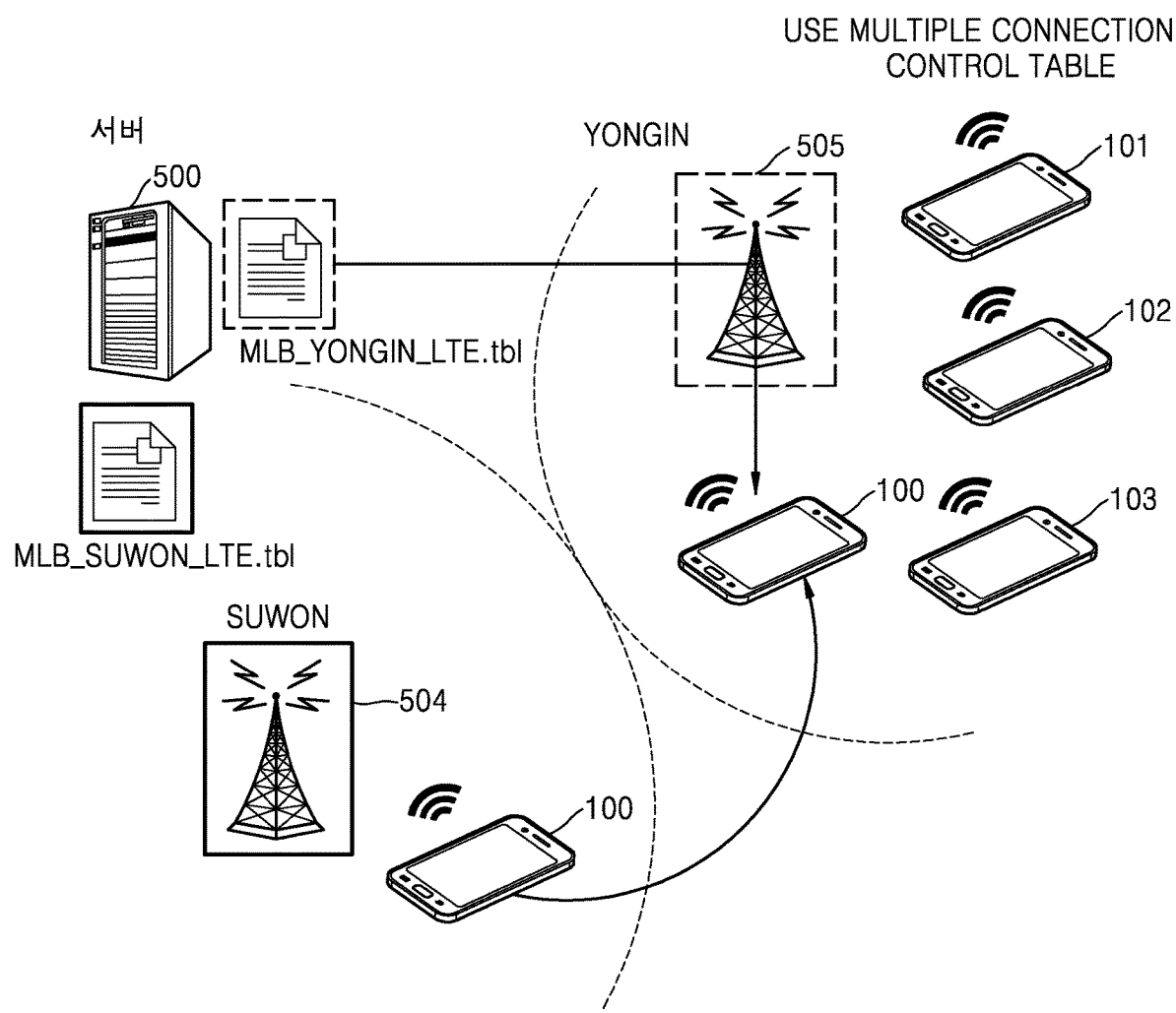
FIG. 21 is a diagram for describing operations when a client moves to another region in the system of FIG. 19.

FIG. 21 is a diagram for describing operations when a client moved to another region in the system of FIG. 19.

In the embodiment of FIG. 21, clients may be classified into a first client group (client 100) in Suwon and a second client group (clients 101, 102, 103, and so on) in Yongin. Also, in the embodiment of FIG. 21, a multiple connection control history of each client and a representative multiple connection setting of each base station are managed in a form of a multiple connection control table.

The server 500 receives the multiple connection control tables from the client groups, and calculates and stores the representative multiple connection control table of the first client group and the representative multiple connection control table of the second client group.

When the client 100 that was using a service in Suwon moves to Yongin, the client 100 requests for the multiple connection control table of the second client group in Yongin since a service characteristic (service channel) is changed.

In FIG. 21, the multiple connection control table transmission request of the client is transmitted to the server through the base station and the multiple connection control table is transmitted from the server to the client through the base station, but in the system of FIG. 20, the base station that received the request of the client may transmit the multiple connection control table directly to the client without through a separate serer.

Here, as described above, when the client and the server shares the common service characteristic-based naming rule, the multiple control table may be more efficiently shared.

For example, when a naming rule, such as service content_region_service method.tbl, is shared, the server 500 prepares and stores a multiple connection control table named MBL_YONGIN_LTE.tbl as shown in FIG. 21, and the client 501 transmits an HTTP message requesting MBL_YONGIN_LTE.tbl prepared according to the same naming rule.

By using such a method, a multiple control connection table may be shared and used via standard HTTP transmission without having to newly define a separate transmission method.

Figure 22:
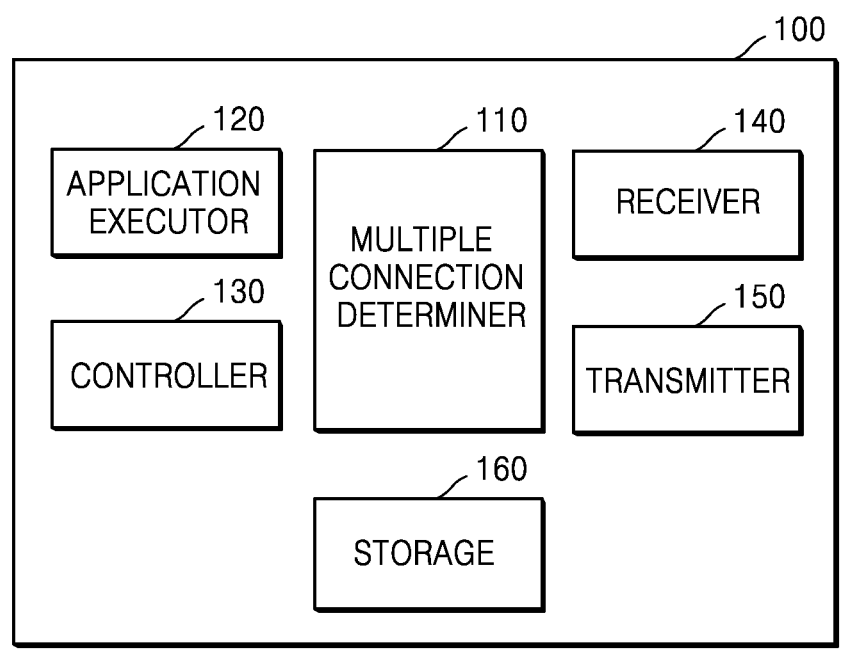
FIG. 22 is a detailed block diagram of a client 100 for controlling multiple connections, according to an embodiment of the present disclosure.

FIG. 22 is a detailed block diagram of the client 100 for controlling multiple connections, according to an embodiment of the present disclosure.

As shown in FIG. 22, the client 100 controlling multiple connections according to an embodiment of the present disclosure includes a multiple connection determiner 110, an application executor 120, a controller 130, a receiver 140, a transmitter 150, and a storage 160.

The multiple connection determiner 110 prepares a multiple connection control table, stores the prepared multiple connection table in the storage 160, and determines the number of multiple connections by using the multiple connection table. When the number of multiple connections and a size of sub-segment are determined, the multiple connection determiner 110 transmits the determined number of multiple connections and the determined size of sub-segment to the controller 130 or transmitter 150.

The application executor 120 executes an application for providing a service from the client to a user. The application executor 120 may transmit a service type of the service provided by the application or a size of data for providing the service, to the multiple connection determiner 110. The application executor 120 may transmit the number of links included in the service provided by the application, to the multiple connection determiner 110.

The receiver 140 receives a segment or sub-segments of data transmitted from a server. Alternatively, according to an embodiment, the receiver 140 may receive a representative multiple connection control table transmitted from the server.

The transmitter 150 transmits the determined number of multiple connections and the determined size of sub-segment, and a multiple connection request according to them, to the server. Alternatively, according to an embodiment, the transmitter 150 transmits a representative multiple connection control table transmission request to the server or a base station.

The storage 160 stores the multiple connection control table determined by the multiple connection determiner 110. Alternatively, according to an embodiment, the storage 160 stores a representative multiple connection table received from a server or a base station.

The controller 130 controls overall operations of the client 100, and controls the multiple connection determiner 110, the application executor 120, the receiver 140, the transmitter 150, and the storage 160 such that the number of multiple connections and the size of sub-segment are determined.

The embodiments according to the present disclosure described above may be recorded on a computer-readable recording medium by being realized in computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured to operate as at least one software module to perform operations of the methods, or vice versa.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A method of multiple connection providing a service by a client, the method comprising:
   executing, by at least one processor, at least one application for providing a service;
   referring to a multiple connection history stored in a memory coupled to the at least one processor, the multiple connection history comprising information about a number of multiple connections and a size of a sub-segment;
   determining, by the at least one processor, the number of multiple connections and the size of the sub-segment based on the referred-to multiple connection history; and
   requesting, by the at least one processor, the multiple connections according to the determined number of multiple connections and the determined size of the sub-segment.

2. The method of claim 1, further comprising:
   determining, by the at least one processor, a service type of the service provided by the at least one application,
   wherein the number of multiple connections and the size of the sub-segment are determined based on the determined service type.

3. The method of claim 2, wherein, when a number of the services to be provided is plural, the determining of the number of multiple connections comprises determining the number of multiple connections to be requested for each of the plurality of services according to a service type determined with respect to each of the plurality of services to be provided.

4. The method of claim 1, wherein the determined number of multiple connections and the determined size of the sub-segment are re-determined based on a segment size.

5. The method of claim 1, further comprising:
   determining, by the at least one processor, a number of at least one link included in a webpage displayed on the at least one application,
   wherein the determining of the number of multiple connections comprises determining the number of multiple connections respectively corresponding to the at least one link based on at least one of a type of a service provided by each of the at least one link and a size of data for the service provided by each of the at least one link.

6. The method of claim 1, wherein the determining of the number of multiple connections comprises:
   calculating a data transmission rate $T(N_i)$ with respect to the number Ni of multiple connections;
   increasing the number Ni to $N_i+\alpha$, and calculating a data transmission rate $T(N_i+\alpha)$ with respect to the increased number $N_i+\alpha$;
   comparing $T(N_i)$ and $T(N_i+\alpha)$; and
   determining the number No of the multiple connections to be Ni when $T(N_i+\alpha) \leq T(N_i)$ based on a result of the comparing, or determining the number No to be $N_i+N$ when $T(N_i+\alpha)>T(N_i)$ based on the result of the comparing,
   wherein N is determined based on an increasing ratio of an average single reception rate $Tas(N_i+\alpha)$ when the number of multiple connections is $N_i+\alpha$ and an average single reception rate $Tas(N_i)$ when the number of multiple connections is $N_i$, i.e., based on $\beta=Tas(N_i+\alpha)/Tas(N_i)$.

7. The method of claim 1, wherein the number of multiple connections is determined based on a multi-transmission mode.

8. The method of claim 7, wherein the multi-transmission mode comprises at least one of an initial mode, an optimal mode, a congestion mode, and an update mode.

9. The method of claim 1,
   wherein the number of multiple connections is determined based on an arrival time difference $dPAT_i$ of an $i^{th}$ packet received by the client, and
   wherein $dPAT_i=PAT_{i+1}-PAT_i$, wherein $PAT_i$ denotes a time when the $i^{th}$ packet is received.

10. The method of claim 9, wherein the determining of the number of multiple connections comprises:
    obtaining the arrival time difference $dPAT_i$;
    generating a first threshold value $T_1$ and a second threshold value $T_2$ by using the obtained $dPAT_i$; and
    updating the first and second threshold values $T_1$ and $T_2$,
    wherein, when an arrival time difference of a current packet is smaller than the first threshold value $T_1$, the number of multiple connections is increased, and
    wherein, when the arrival time difference of the current packet is greater than the second threshold value $T_2$, the number of multiple connections is decreased.

11. The method of claim 10,
    wherein the first threshold value $T_1$ denotes a packet arrival time difference in which a Bayes error rate of a proportion of samples having $dPAT_i$ greater than the first threshold value $T_1$ from among $dPAT_i$ samples $\omega1$ obtained while the number of multiple connections is increasing and Bayes error rate of a proportion of samples having $dPAT_i$ smaller than the first threshold value $T_1$ from among $dPAT_i$ samples $\omega2$ obtained while the number of multiple connections is maintained are minimum, and
    wherein the second threshold value $T_2$ denotes a packet arrival time difference in which a Bayes error rate of a proportion of samples having $dPAT_i$ greater than the second threshold value $T_2$ from among the $\omega2$ and a Bayes error rate of a proportion of samples having $dPAT_i$ smaller than the second threshold value $T_2$ from among $dPAT_i$ samples $\omega3$ obtained while the number of multiple connections is decreasing are minimum.

12. A method of multiple connection providing a service by a client, the method comprising:
    receiving, by a receiver, a multiple connection history from at least one client;
    classifying, by at least one processor, the received multiple connection history;
    determining, by the at least one processor, a representative multiple connection setting based on the classified multiple connection history;
    storing, by a memory coupled to the at least one processor, the determined representative multiple connection setting;
    receiving, by the receiver, a transmission request of the representative multiple connection setting; and
    transmitting, by a transmitter, the representative multiple connection setting whose transmission request is received.

13. A client apparatus multi-connecting to provide a service, the client apparatus comprising:
- a memory;
- a transmitter; and
- at least one processor configured to:
  - execute at least one application for providing a service,
  - control the memory to store a multiple connection history comprising information about a number of multiple connections and a size of a sub-segment,
  - refer to the stored multiple connection history and determine the number of multiple connections and the size of the sub-segment based on the referred multiple connection history, and
  - control the transmitter to transmit a multiple connection request according to the determined number of multiple connections and the determined size of the sub-segment.

14. The client apparatus of claim 13,
wherein the at least one processor is further configured to determine a service type of the service provided by the at least one application, and
wherein the number of multiple connections and the size of the sub-segment are determined based on the determined service type.

15. The client apparatus of claim 14, wherein, when a number of the services to be provided is plural, the at least one processor is further configured to process determining the number of multiple connections to be requested for each of the plurality of services according to a service type determined with respect to each of the plurality of services to be provided.

16. The client apparatus of claim 13, wherein the at least one processor is further configured to re-determine the determined number of multiple connections and the determined size of the sub-segment based on a segment size.

17. The client apparatus of claim 13,
wherein the at least one processor is further configured to process determining a number of at least one link included in a webpage displayed on the at least one application, and
wherein the determining of the number of multiple connections comprises determining the number of multiple connections respectively corresponding to the at least one link based on at least one of a type of a service provided by each of the at least one link and a size of data for the service provided by each of the at least one link.

18. The client apparatus of claim 13,
wherein the at least one processor is further configured to:
  - calculate a data transmission rate $T(N_i)$ with respect to the number Ni of multiple connections,
  - increase the number Ni to $N_i + \alpha$, and calculate a data transmission rate $T(N_i + \alpha)$ with respect to the increased number $N_i + \alpha$,
  - compare $T(N_i)$ and $T(N_i + \alpha)$, and
  - determine the number No of the multiple connections to be Ni when $T(N_i +) < T(N_i)$ based on a result of the comparing, or determine the number No to be $N_i + N$ when $T(N_i + \alpha) > T(N_i)$ based on the result of the comparing, and
wherein N is determined based on an increasing ratio of an average single reception rate $Tas(N_i + \alpha)$ when the number of multiple connections is $N_i + \alpha$ and an average single reception rate $Tas(N_i)$ when the number of multiple connections is $N_i$, i.e., based on $\beta = Tas(N_i + \alpha) / Tas(N_i)$.

19. The client apparatus of claim 13, wherein the number of multiple connections is determined based on a multi-transmission mode.

20. A non-transitory computer-readable recording medium having recorded thereon a computer program for executing the multiple connection, the computer program when executed by at least one processor, causes the at least one processor to perform:
- executing at least one application for providing a service;
- referring to a multiple connection history comprising information about a number of multiple connections and a size of a sub-segment;
- determining the number of multiple connections and the size of the sub-segment based on the referred-to multiple connection history; and
- requesting the multiple connections according to the determined number of multiple connections and the determined size of the sub-segment.

* * * * *